(12) United States Patent
Kato et al.

(10) Patent No.: US 9,160,531 B2
(45) Date of Patent: *Oct. 13, 2015

(54) HOST DEVICE, SEMICONDUCTOR MEMORY DEVICE, AND AUTHENTICATION METHOD

(71) Applicant: KABUSHIKI KAISHA TOSHIBA, Minato-ku (JP)

(72) Inventors: Taku Kato, Kamakura (JP); Tatsuyuki Matsushita, Tokyo (JP); Yuji Nagai, Sagamihara (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/523,225

(22) Filed: Oct. 24, 2014

(65) Prior Publication Data

US 2015/0046720 A1 Feb. 12, 2015

Related U.S. Application Data

(63) Continuation of application No. 14/135,428, filed on Dec. 19, 2013, now Pat. No. 8,990,571, which is a continuation of application No. 13/524,532, filed on Jun. 15, 2012, now Pat. No. 8,667,286.

(30) Foreign Application Priority Data

Jan. 16, 2012 (JP) .................................. 2012-005839

(51) Int. Cl.
*G06F 12/14* (2006.01)
*G06F 21/60* (2013.01)
(Continued)

(52) U.S. Cl.
CPC .......... *H04L 9/0861* (2013.01); *G06F 12/1408* (2013.01); *G06F 21/602* (2013.01);
(Continued)

(58) Field of Classification Search
CPC ... G06F 21/602; G06F 21/72; G06F 12/1408; G06F 21/71; H04L 9/0866
See application file for complete search history.

(56) References Cited

U.S. PATENT DOCUMENTS 4,757,468 A 7/1988 Domenik et al.
4,760,526 A 7/1988 Takeda et al.
(Continued)

FOREIGN PATENT DOCUMENTS

CN 101084504 A 12/2007
EP 1 126 355 A1 8/2001
(Continued)

OTHER PUBLICATIONS

"Content Protection for Recordable Media (CPRM) Specification: SD Memory Card Book Common Part", 4C Entity, LLC, http://www.4centity.com, Revision 0.97, Dec. 15, 2010, 20 pages.
(Continued)

*Primary Examiner* — Yonas Bayou
(74) *Attorney, Agent, or Firm* — Oblon, McClelland, Maier & Neustadt, L.L.P.

(57) ABSTRACT

According to one embodiment, encrypted secret identification information (E-SecretID) and the key management information (FKB) are read from a memory device. Encrypted management key (E-FKey) is obtained using the key management information (FKB) and index information (k). The index information (k) and the encrypted management key (E-FKey) are transmitted to the semiconductor memory device. An index key (INK) is generated using the first key information (NKey) and the received index information (k). The encrypted management key (E-FKey) is decrypted using the index key (INK) to obtain management key (FKey), which is transmitted to the host device.

1 Claim, 28 Drawing Sheets

(51) Int. Cl.
*H04L 9/08* (2006.01)
*H04L 9/32* (2006.01)
(52) U.S. Cl.
CPC ............ *H04L 9/0816* (2013.01); *H04L 9/0822* (2013.01); *H04L 9/0833* (2013.01); *H04L 9/0897* (2013.01); *H04L 9/32* (2013.01); *G06F 2212/1052* (2013.01); *H04L 2209/601* (2013.01)

(56) References Cited

U.S. PATENT DOCUMENTS

| | | | |
|---|---|---|---|
| 4,910,774 | A | 3/1990 | Barakat |
| 6,829,676 | B2 | 12/2004 | Maeda et al. |
| 6,950,379 | B2 | 9/2005 | Yen et al. |
| 7,065,648 | B1 | 6/2006 | Kamibayashi et al. |
| 7,240,157 | B2 | 7/2007 | Frank et al. |
| 7,266,695 | B2 | 9/2007 | Nakayama |
| 7,395,429 | B2 | 7/2008 | Kitani et al. |
| 7,484,090 | B2 | 1/2009 | Ohmori et al. |
| 7,533,276 | B2 | 5/2009 | Matsushima et al. |
| 7,565,698 | B2 | 7/2009 | Isozaki et al. |
| 7,712,131 | B1 | 5/2010 | Lethe |
| 7,721,343 | B2 | 5/2010 | Kato et al. |
| 7,788,433 | B2 * | 8/2010 | Henry et al. ............... 710/261 |
| 7,797,536 | B1 | 9/2010 | Lyle |
| 7,971,070 | B2 | 6/2011 | Lotspiech et al. |
| 7,979,915 | B2 | 7/2011 | Nakano et al. |
| 8,020,199 | B2 | 9/2011 | Smith et al. |
| 8,131,646 | B2 | 3/2012 | Kocher et al. |
| 8,260,259 | B2 | 9/2012 | Semple et al. |
| 8,261,130 | B2 | 9/2012 | Mayer et al. |
| 8,290,146 | B2 | 10/2012 | Takashima |
| 8,296,477 | B1 | 10/2012 | Polk |
| 8,321,924 | B2 | 11/2012 | Lu et al. |
| 8,336,096 | B2 | 12/2012 | Narusawa et al. |
| 8,364,881 | B2 | 1/2013 | Urabe |
| 8,381,062 | B1 | 2/2013 | Juels et al. |
| 8,488,785 | B2 * | 7/2013 | Patawaran et al. ............ 380/46 |
| 8,510,548 | B1 | 8/2013 | Markov et al. |
| 8,583,943 | B2 * | 11/2013 | Dodd ........................ 713/193 |
| 8,634,557 | B2 * | 1/2014 | Nagai et al. .................. 380/255 |
| 8,677,144 | B2 | 3/2014 | Haider et al. |
| 8,761,389 | B2 * | 6/2014 | Nagai et al. ................... 380/28 |
| 8,812,843 | B2 * | 8/2014 | Nagai et al. ................. 713/168 |
| 2001/0021255 | A1 | 9/2001 | Ishibashi |
| 2002/0059518 | A1 * | 5/2002 | Smeets et al. ................. 713/166 |
| 2002/0087814 | A1 * | 7/2002 | Ripley et al. .................. 711/154 |
| 2002/0087871 | A1 * | 7/2002 | Ripley .......................... 713/193 |
| 2002/0116632 | A1 * | 8/2002 | Itoh et al. ...................... 713/200 |
| 2003/0070082 | A1 | 4/2003 | Nimura et al. |
| 2003/0105961 | A1 * | 6/2003 | Zatloukal et al. ............. 713/170 |
| 2003/0154355 | A1 | 8/2003 | Fernandez |
| 2003/0221116 | A1 | 11/2003 | Futoransky et al. |
| 2004/0039924 | A1 | 2/2004 | Baldwin et al. |
| 2004/0133794 | A1 | 7/2004 | Kocher et al. |
| 2005/0038997 | A1 | 2/2005 | Kojima et al. |
| 2005/0039022 | A1 | 2/2005 | Venkatesan et al. |
| 2005/0086497 | A1 | 4/2005 | Nakayama |
| 2005/0182948 | A1 | 8/2005 | Ducharme |
| 2005/0257243 | A1 | 11/2005 | Baker |
| 2005/0262347 | A1 | 11/2005 | Sato et al. |
| 2006/0060065 | A1 | 3/2006 | Abe et al. |
| 2006/0085644 | A1 | 4/2006 | Isozaki et al. |
| 2006/0141987 | A1 | 6/2006 | De Groot |
| 2007/0074050 | A1 | 3/2007 | Camiel |
| 2007/0143838 | A1 | 6/2007 | Milligan et al. |
| 2007/0174198 | A1 | 7/2007 | Kasahara et al. |
| 2007/0186110 | A1 | 8/2007 | Takashima |
| 2008/0049934 | A1 | 2/2008 | Onoda et al. |
| 2008/0098212 | A1 | 4/2008 | Helms et al. |
| 2008/0101604 | A1 | 5/2008 | Kocher et al. |
| 2008/0172427 | A1 | 7/2008 | Ito |
| 2008/0210747 | A1 | 9/2008 | Takashima |
| 2008/0228821 | A1 | 9/2008 | Mick et al. |
| 2008/0263362 | A1 | 10/2008 | Chen |
| 2008/0294562 | A1 | 11/2008 | Kasahara et al. |
| 2009/0106551 | A1 | 4/2009 | Boren et al. |
| 2009/0232314 | A1 | 9/2009 | Kato et al. |
| 2009/0249492 | A1 | 10/2009 | Boesgaard Sorensen |
| 2009/0313480 | A1 | 12/2009 | Michiels et al. |
| 2010/0008509 | A1 | 1/2010 | Matsushita et al. |
| 2010/0017626 | A1 | 1/2010 | Sato et al. |
| 2010/0146501 | A1 | 6/2010 | Wyatt et al. |
| 2010/0199129 | A1 | 8/2010 | Kitani |
| 2010/0268953 | A1 | 10/2010 | Matsukawa et al. |
| 2010/0275036 | A1 | 10/2010 | Harada et al. |
| 2011/0145596 | A1 * | 6/2011 | Jordan et al. ................... 713/189 |
| 2011/0222691 | A1 | 9/2011 | Yamaguchi et al. |
| 2011/0225089 | A1 | 9/2011 | Hammad |
| 2011/0276490 | A1 | 11/2011 | Wang et al. |
| 2012/0137135 | A1 | 5/2012 | Kasahara et al. |
| 2012/0137137 | A1 | 5/2012 | Brickell et al. |
| 2013/0054961 | A1 | 2/2013 | Kato et al. |
| 2013/0159733 | A1 | 6/2013 | Lee et al. |
| 2014/0237258 | A1 * | 8/2014 | Nagai et al. ................... 713/189 |

FOREIGN PATENT DOCUMENTS

| | | |
|---|---|---|
| EP | 1 983 466 A2 | 10/2008 |
| EP | 1 983 466 A3 | 10/2008 |
| JP | 63-29785 | 2/1988 |
| JP | 63-70634 | 3/1988 |
| JP | 3-171231 A | 7/1991 |
| JP | 8-204702 A | 8/1996 |
| JP | 10-232918 A | 9/1998 |
| JP | 2000-122931 A | 4/2000 |
| JP | 2001-209305 A | 8/2001 |
| JP | 2003-143128 | 5/2003 |
| JP | 2003-233795 A | 8/2003 |
| JP | 2004-30326 A | 1/2004 |
| JP | 2005-316946 | 11/2005 |
| JP | 2005-341156 A | 12/2005 |
| JP | 2006-172147 A | 6/2006 |
| JP | 2007-208897 | 8/2007 |
| JP | 2007-525748 A | 9/2007 |
| JP | 2008-22367 A | 1/2008 |
| JP | 2008-35397 A | 2/2008 |
| JP | 2008-506317 A | 2/2008 |
| JP | 2008-84445 A | 4/2008 |
| JP | 2008-269088 A | 11/2008 |
| JP | 2009-87497 A | 4/2009 |
| JP | 2009-100394 A | 5/2009 |
| JP | 2009-105566 | 5/2009 |
| JP | 2009-543244 | 12/2009 |
| JP | 2010-28485 A | 2/2010 |
| JP | 2010-140470 | 6/2010 |
| JP | 2010-183278 A | 8/2010 |
| JP | 2010-267240 A | 11/2010 |
| JP | 2010-267540 A | 11/2010 |
| JP | 2010-268417 A | 11/2010 |
| JP | 2010-287005 A | 12/2010 |
| JP | 2011-209802 A | 10/2011 |
| JP | 2011-215983 A | 10/2011 |
| JP | 2012-14416 A | 1/2012 |
| JP | 2013-55370 | 3/2013 |
| JP | 2013-106162 | 5/2013 |
| TW | I266190 | 11/2006 |
| WO | WO 01/11883 A1 | 2/2001 |
| WO | WO 02/33521 A2 | 4/2002 |
| WO | WO 02/33521 A3 | 4/2002 |
| WO | WO 03/048938 A1 | 6/2003 |
| WO | WO 2007/028099 A2 | 3/2007 |
| WO | WO 2010/035449 A1 | 4/2010 |
| WO | WO 2011/064883 A1 | 6/2011 |

OTHER PUBLICATIONS

"Media Identifier Management Technology (MIMT) Specification", 4C Entity, LLC, http://www.4centity.com, Revision 0.85, Sep. 27, 2010, 13 pages.

Dalit Naor, et al., "Revocation and Tracing Schemes for Stateless Receivers", Proc. Crypto, 2001, pp. 41-62.

(56) References Cited

OTHER PUBLICATIONS

"Content Protection for Recordable Media (CPRM) Specification: Introduction and Common Cryptographic Elements", 4C Entity, LLC, http://www.4centity.com, Revision 1.1, Dec. 15, 2010, 38 pages.
Office Action issued Oct. 16, 2012 in Japanese Patent Application No. 2011-265281 with English language translation.
Office Action issued Oct. 16, 2012 in Japanese Patent Application No. 2011-265289 with English language translation.
Office Action issued Nov. 20, 2012 in Japanese Patent Application No. 2011-248056 with English language translation.
Office Action issued Nov. 27, 2012 in Japanese Patent Application No. 2011-265281 with English language translation.
David Hoff, et al., "System and software security via authentication handshake in EPROM", 1985 Proceedings of the National Computer Conference, http://www.computer.org/csdl/proceedings/afips/1985/5092/00/50920203-abs.html>, vol. 54, 1985, pp. 203-209 with cover page.
International Search Report and Written Opinion issued Nov. 22, 2012 in Application No. PCT/JP2012/065938.
International Search Report and Written Opinion issued Aug. 16, 2012 in PCT/JP2012/058276 filed Mar. 19, 2012.
International Search Report and Written Opinion issued Nov. 22, 2012 in PCT/JP2012/065932, filed Jun. 15, 2012.
International Search Report and Written Opinion issued Nov. 22, 2012 in PCT/JP2012/065933, filed Jun. 15, 2012.
International Search Report and Written Opinion issued Nov. 22, 2012 in PCT/JP2012/065937, filed Jun. 15, 2012.
International Search Report and Written Opinion issued Nov. 22, 2012, in PCT/JP2012/065934 filed Jun. 15, 2012.
International Search Report and Written Opinion issued Nov. 22, 2012 in PCT/JP2012/065935 filed Jun. 15, 2012.
"Content Protection for Recordable Media Specification", Revision 1.0, 4C Entity, LLC., http://www.4centity.com, Jan. 17, 2003, 31 pages.
"Content Protection for eXtended Media Specification", Revision 0.85 Preliminary Release, 4C Entity, LLC, http://www.4CEntity.com, Sep. 27, 2010, 31 pages.
"Content Protection for Prerecorded Media Specification: Introduction and Common Cryptographic Elements", Revision 1.0, 4centity, Jan. 17, 2003, 25 pages.
"Content Protection for eXtended Media Specification: SD Memory Card Book Common Part", Revision 0.85 Preliminary Release, 4centity, Sep. 27, 2010, 38 pages.
"Next Generation Secure Memory", www.nextgenerationsecurememory.com, Mar. 2012, 9 Pages.
Kocher, P., et al., "Self-Protecting Digital Content-A Technical Report From the CRI Content Security Research Initiative," Cryptography Research, Inc., http://www.cryptography.com/public/pdf/selfprotectingcontent.pdf, 2003, pp. 1-14.
"Introduction and Common Cryptographic Elements Book," Advanced Access Content System (AACS), Revision 0.953, http://www.aacsla.com/specifications, Oct. 26, 2012, Total 102 Pages.
"Pre-recorded Video Book," Advanced Access Content System (AACS), Revision 0.952, http://www.aacsla.com/specifications, Jul. 14, 2011, Total 86 Pages.
International Search Report Issued Jun. 28, 2011 in PCT/JP11/62860 Filed May 30, 2011.
"Prepared Video Book," Advanced Access Content System (AACS), Revision 0.953, http://www.aacsla.com/specifications, Oct. 26, 2012, Total 45 Pages.
"Recordable Video Book," Advanced Access Content System (AACS), Revision 0.953, http://www.aacsla.com/specifications,Oct. 26, 2012, Total 22 Pages.
"Blu-ray Disc Pre-recorded Book," Advanced Access Content System (AACS), Revision 0.953, http://www.aacsla.com/specifications, Oct. 26, 2012, Total 173 Pages.
"Blu-ray Disc Prepared Video Book," Advanced Access Content System (AACS), Revision 0.953, http://www.aacsla.com/specifications, Oct. 26, 2012, Total 59 Pages.
"Blu-ray Disc Recordable Book," Advanced Access Content System (AACS), Revision 0.953, http://www.aacsla.com/specifications, Oct. 26, 2012, Total 61 Pages.
"HD DVD and DVD Pre-recorded Book," Advanced Access Content System (AACS), Revision 0.953, http://www.aacsla.com/specifications, Oct. 26, 2012, Total 154 Pages.
"HD DVD and DVD Prepared Video Book,"Advanced Access Content System (AACS), Revision 0.953, http://www.aacsla.com/specifications, Oct. 26, 2012, Total 43 Pages.
"HD DVD and DVD Recordable Book,"Advanced Access Content System (AACS), Revision 0.953, http://www.aacsla.com/specifications, Oct. 26, 2012, Total 65 Pages.
"Signed CSS Book," Advanced Access Content System (AACS), Revision 0.953, http://www.aacsla.com/specifications, Oct. 26, 2012, Total 18 Pages.
"Introduction and Common Cryptographic Elements," Advanced Access Content System (AACS), Revision 0.91, http://www.aacsla.com/specifications, Feb. 17, 2006, Total 82 Pages.
"Pre-recorded Video Book,"Advanced Access Content System (AACS), Revision 0.92, http://www.aacsla.com/specifications, Total 61 Pages, (Nov. 29, 2007) Additional References sheet(s) attached.
"Recordable Video Book," Advanced Access Content System (AACS), Revision 0.91, http://www.aacsla.com/specifications, Total 23 Pages, (Feb. 17, 2006).
"CBHD Pre-recorded Book," Advanced Access Content System (AACS), Revision 0.90, http://www.aacsla.com/specifications, Total 91 Pages, (Oct. 7, 2008).
"Blu-ray Disc Pre-recorded Book," Advanced Access Content System (AACS), Revision 0.921, http://www.aacsla.com/specifications, Total 117 Pages, (Jun. 6, 2008).
"Blu-ray Disc Recordable Book," Advanced Access Content System (AACS), Revision 0.921, http://www.aacsla.com/specifications, Total 55 Pages, (Aug. 5, 2008).
"HD DVD and DVD Pre-recorded Book,"Advanced Access Content System (AACS), Revision 0.912, http://www.aacsla.com/specifications, Total 166 Pages, (Aug. 15, 2006).
"HD DVD and DVD Recordable Book,"Advanced Access Content System (AACS), Revision 0.921, http://www.aacsla.com/specifications, Total 59 Pages, (Jul. 25, 2006).
"Content Protection for Recordable Media Specification SD Memory Card Book Common Part", (Intel Corporation), Revision 0.96, Nov. 26, 2001, 4C Entity, LLC, 36 pages.
English translation of the International Preliminary Report on Patentability issued Apr. 25, 2013, in PCT/JP2011/062860, filed May 30, 2011.
English translation of the Written Opinion of the International Searching Authority issued Jun. 28, 2011, in PCT/JP2011/062860, filed May 30, 2011.
Japanese Office Action (with English Translation) mailed Nov. 22, 2013 in patent application No. 2012-209681.
Chinese Office Action (with English Translation) mailed Nov. 4, 2013 in patent application No. 100120444.
International Preliminary Report on Patentability and Written Opinion issued Jun. 12, 2014, in International Application No. PCT/JP2012/065933 (English Translation).
International Preliminary Report on Patentability and Written Opinion issued May 22, 2014, in International Application No. PCT/JP2012/065937(English Translation).
Alfred J. Menezes, et al., "Handbook of Applied Cryptography", CRC Press LLC, 1997, pp. 42, 192, 226, 227, and 246.
International Preliminary Report on Patentability and Written Opinion of the International Searching Authority mailed Jul. 31, 2014, in International Application No. PCT/JP2012/065938, filed Jun. 15, 2012.
Office Action issued Oct. 3, 2014 in co-pending U.S. Appl. No. 13/775,527.
Office Action issued Oct. 7, 2014 in co-pending U.S. Appl. No. 13/766,940.
Chinese Office Action dated Jul. 27, 2015, issued in Chinese Patent Application No. 201280037800.X (with English translation).

* cited by examiner

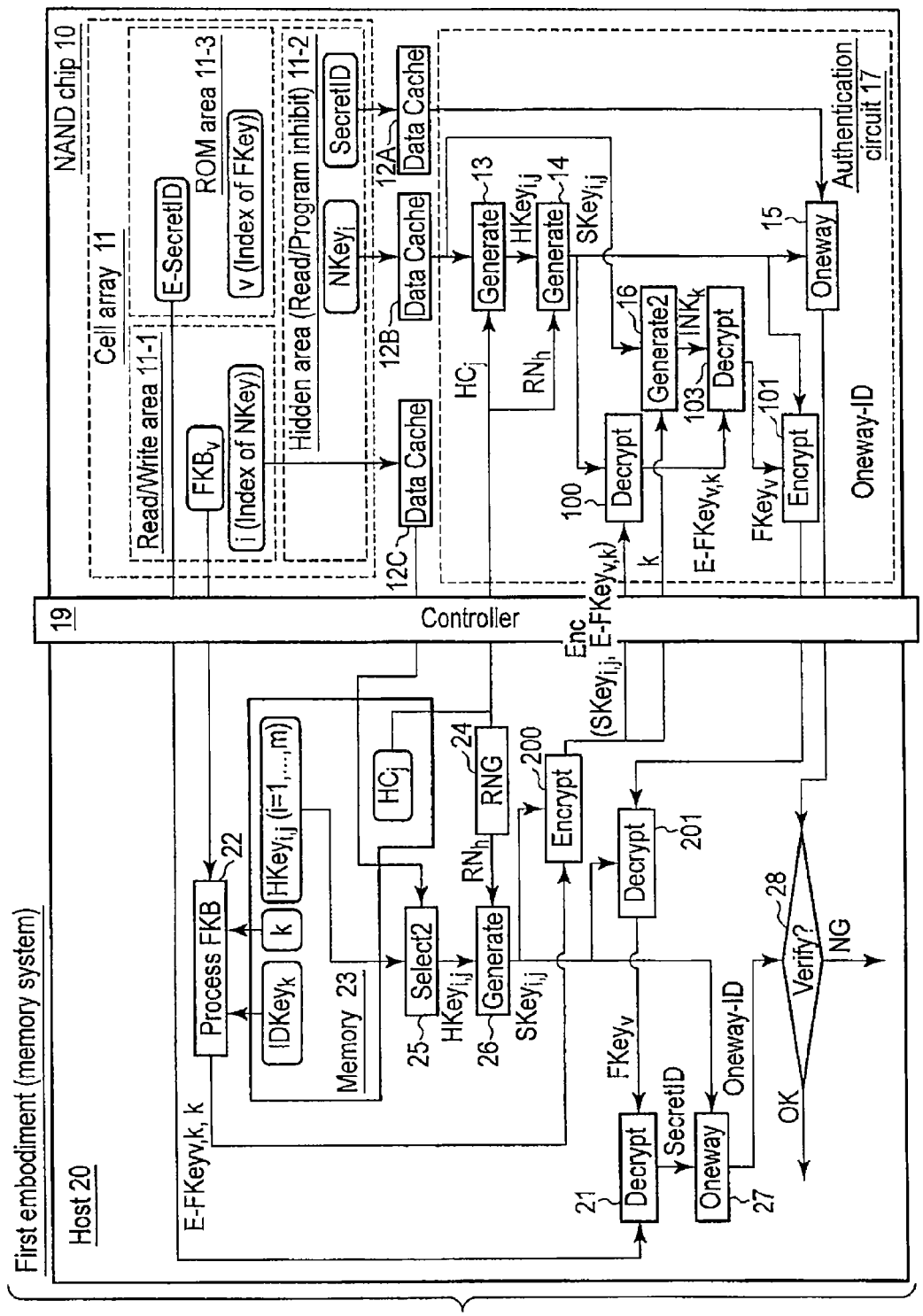
F I G. 1

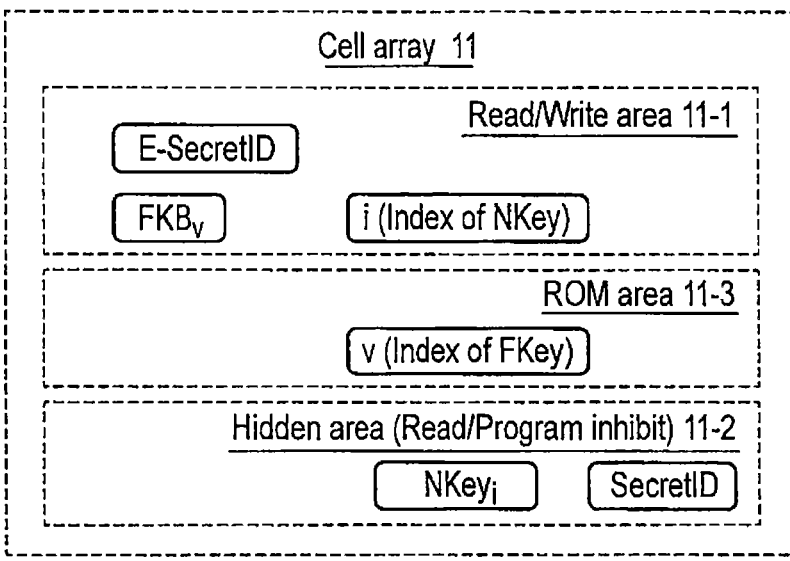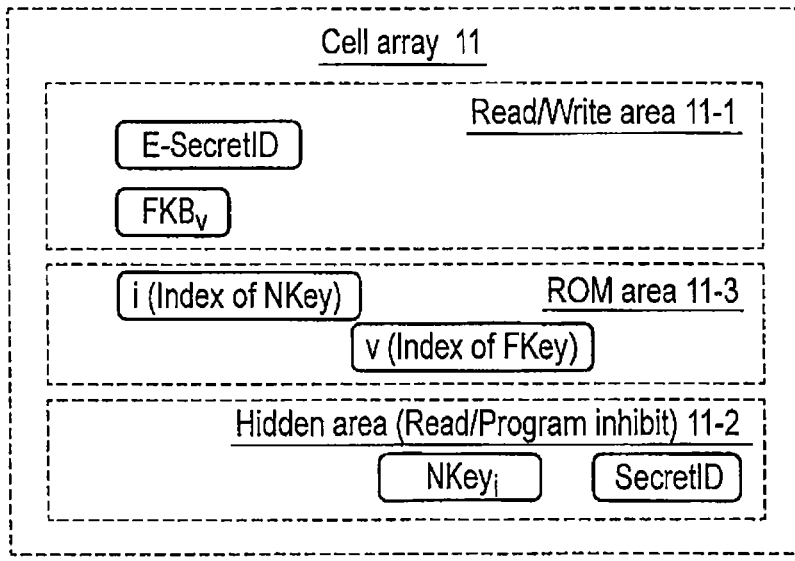
F I G. 2

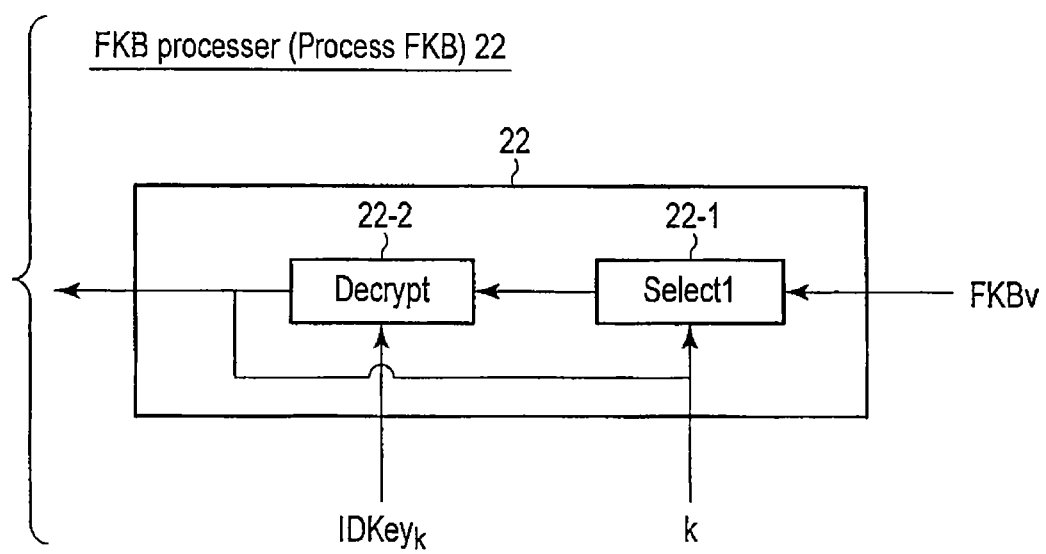
F I G. 3

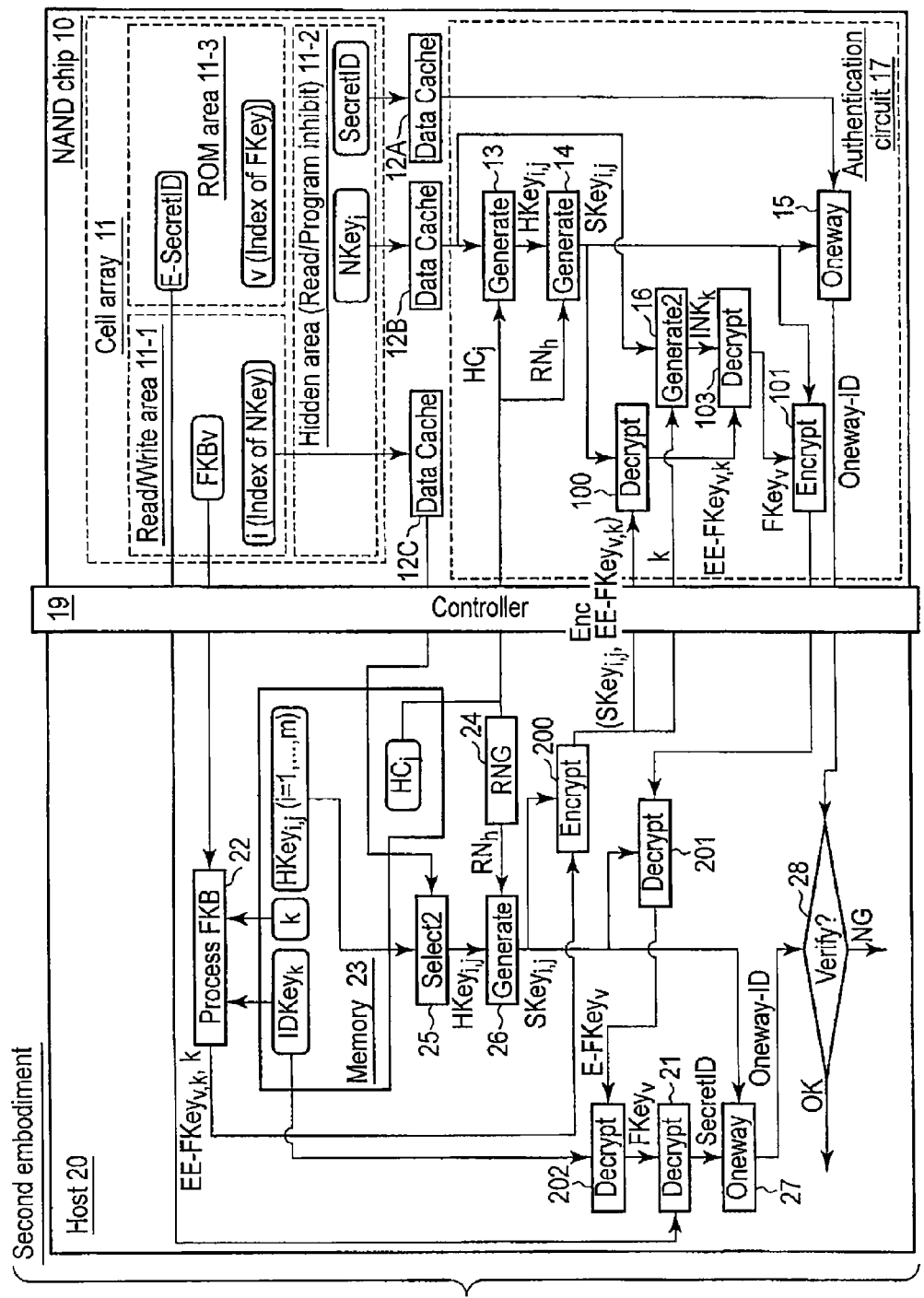
F I G. 9

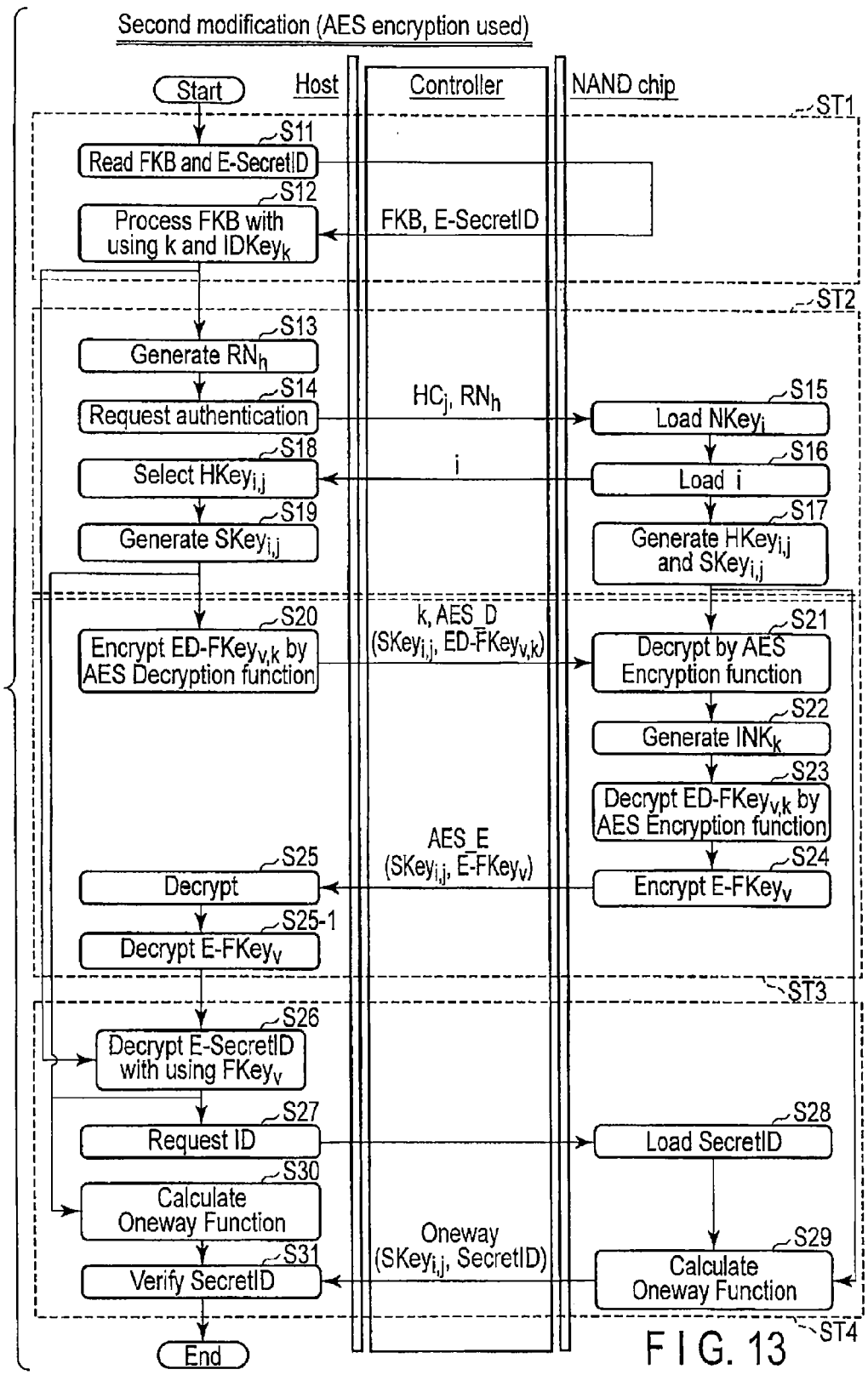
F I G. 13

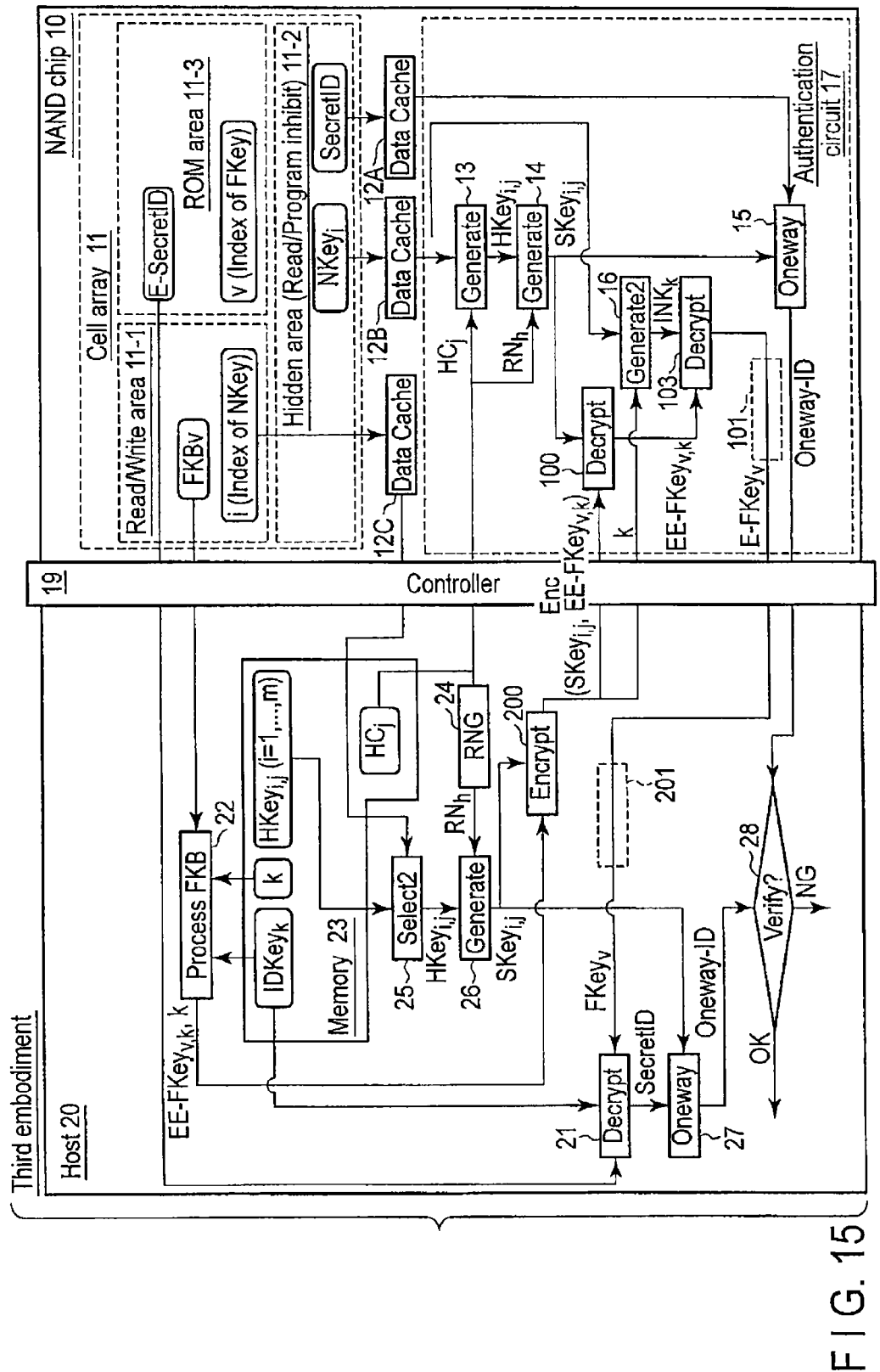
F I G. 15

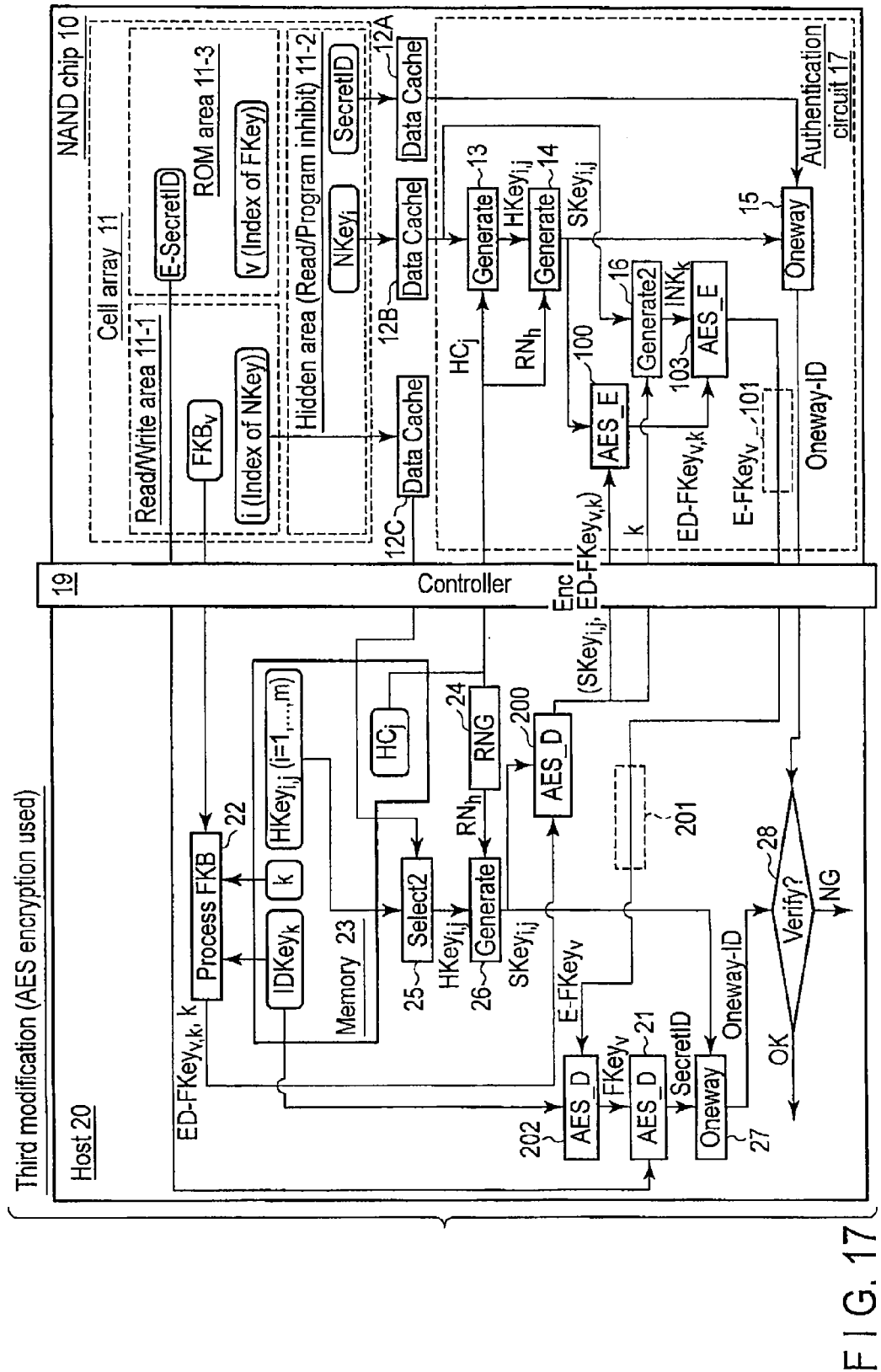
F I G. 17

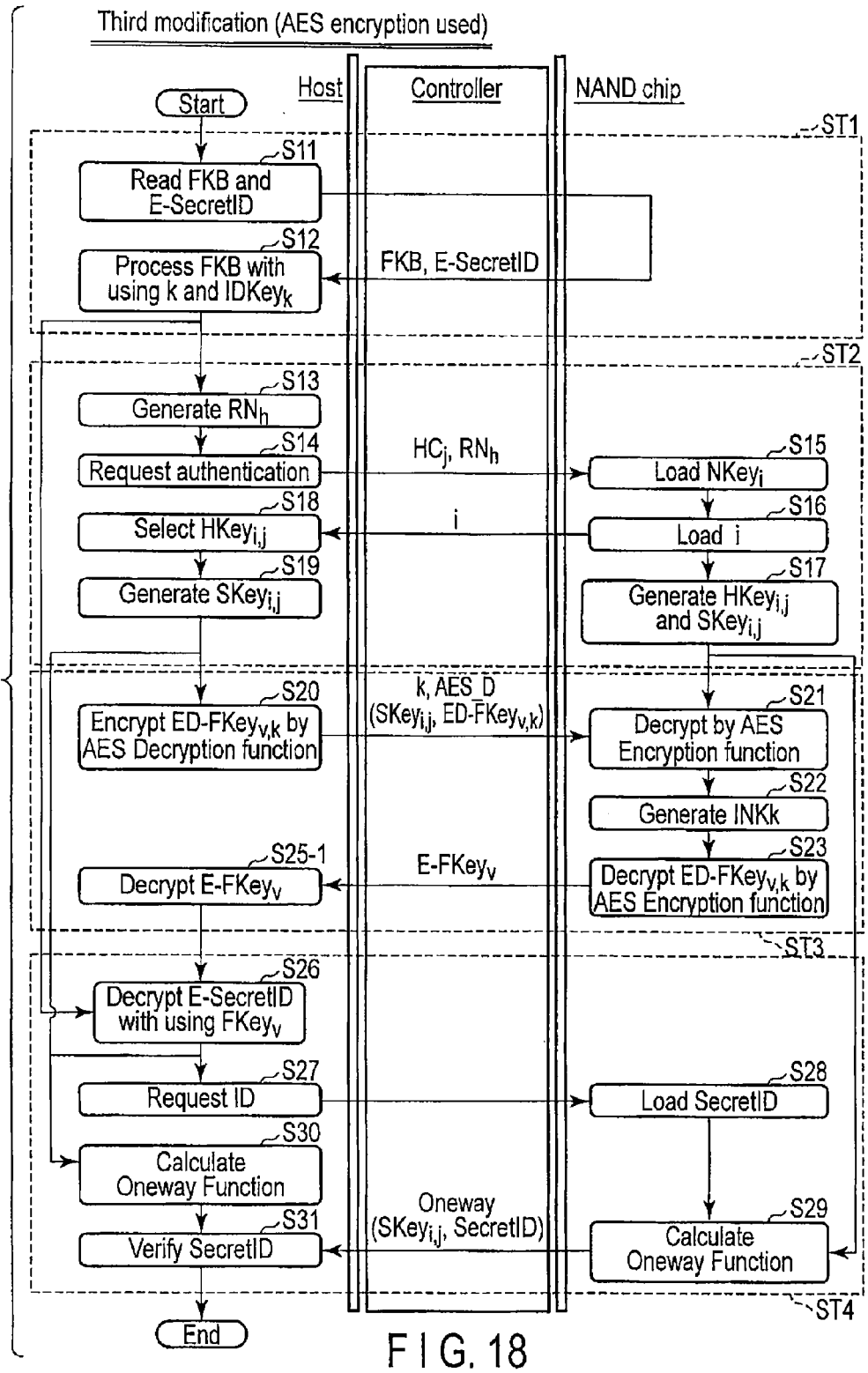
F I G. 18

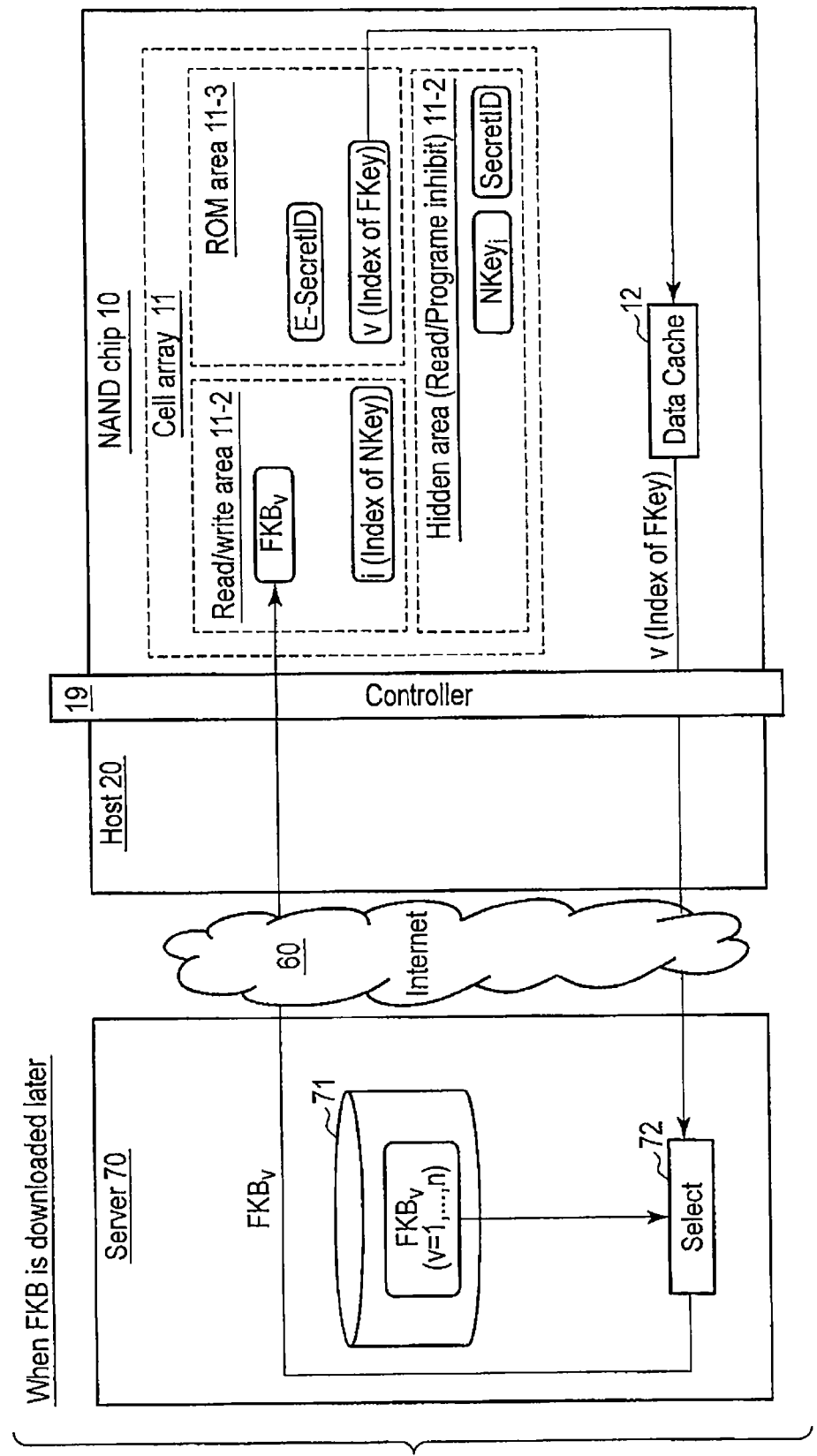
F I G. 22

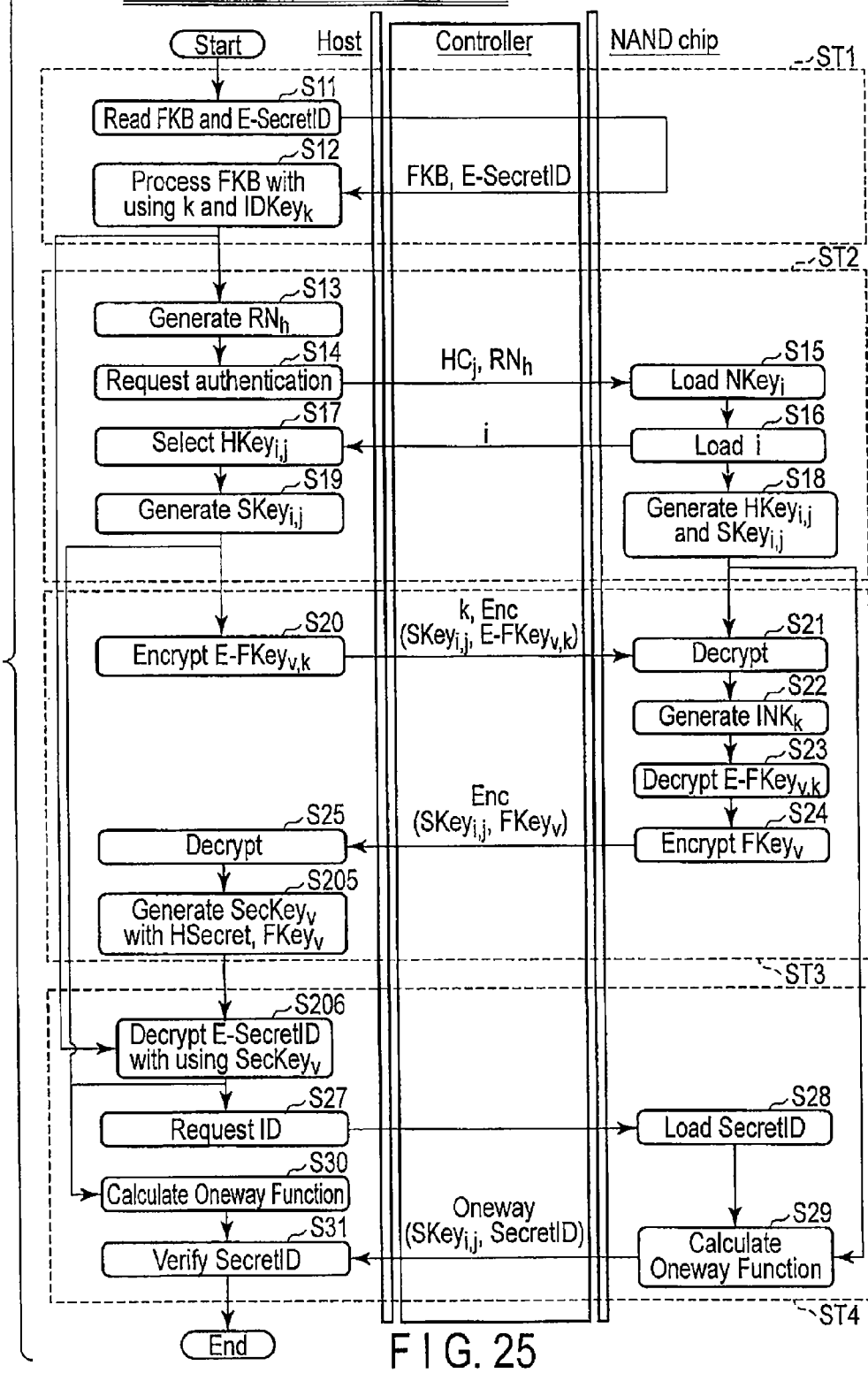
F I G. 25

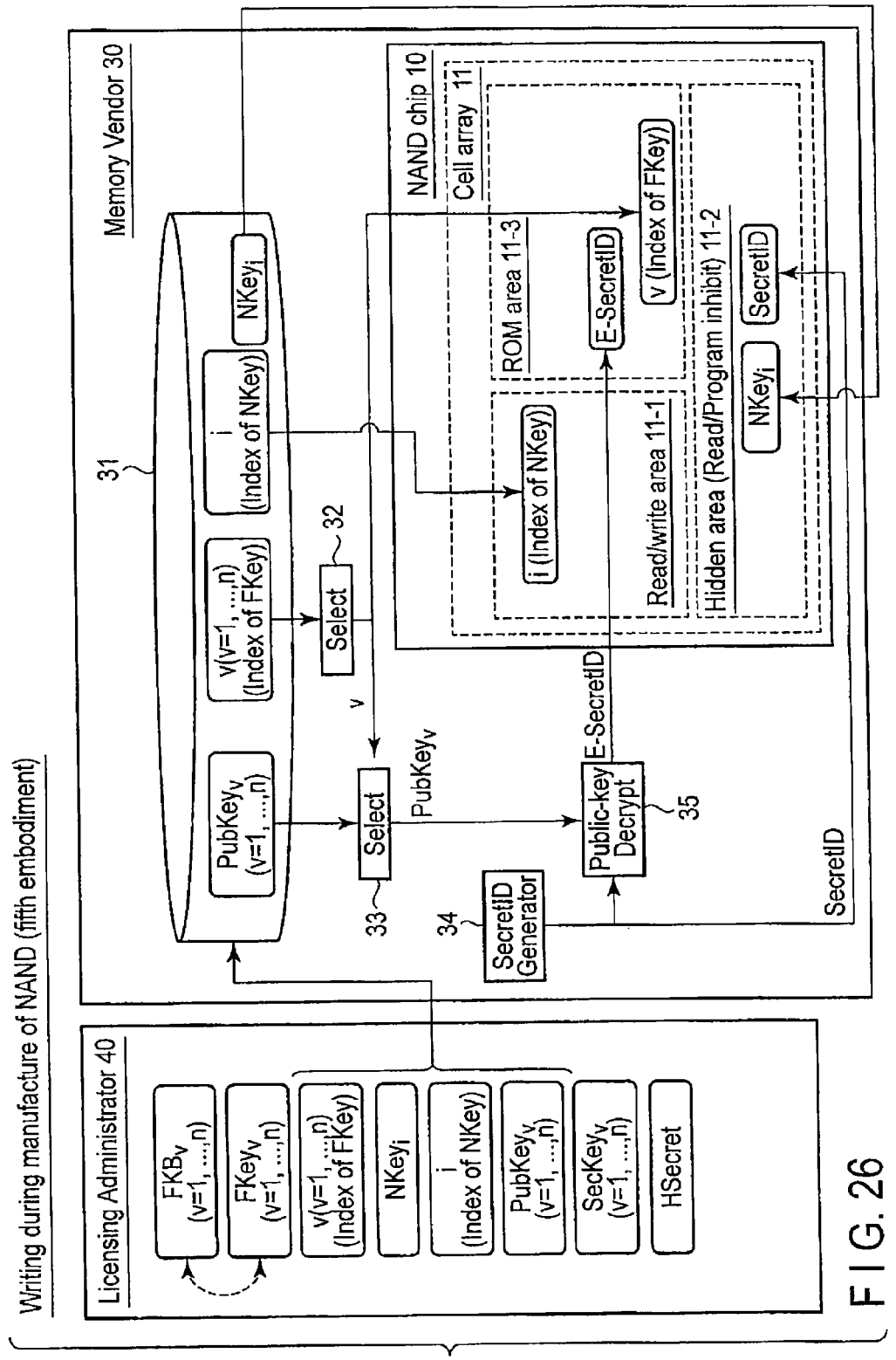
F I G. 26

HOST DEVICE, SEMICONDUCTOR MEMORY DEVICE, AND AUTHENTICATION METHOD

CROSS-REFERENCE TO RELATED APPLICATIONS

This application is a Continuation of and claims the benefit of priority under 35 U.S.C. §120 from U.S. Ser. No. 14/135,428, filed Dec. 19, 2013, which is a continuation of U.S. Ser. No. 13/524,532, filed Jun. 15, 2012, now U.S. Pat. No. 8,667,286, and is based upon and claims the benefit of priority from prior Japanese Patent Application No. 2012-005839, filed Jan. 16, 2012, the entire contents of each of which are incorporated herein by reference.

FIELD

Embodiments described herein relate generally to a host device, semiconductor memory device, and authentication method.

BACKGROUND

In general, in fields of information security, a method using mutually shared secret information and an encryptor is adopted as means for certifying one's own authenticity.

For example, in an IC card (Smart Card), etc., which are used for electronic settlement, an ID and secret information for individualizing the IC card are stored in an IC in the card. Further, the IC card has a cipher processing function for executing authentication based on the ID and secret information.

In another example, an authentication method called Content Protection for Recordable Media (CPRM) is specified as means for certifying authenticity of an SD (registered trademark) card in protection of copyrighted content.

BRIEF DESCRIPTION OF THE DRAWINGS

FIG. 1 is a block diagram showing a configuration example of a memory system according to a first embodiment;

FIG. 2 shows other examples of data store location;

FIG. 3 is a block diagram of a configuration example of an FKB processor;

FIG. 9 is a block diagram showing a configuration example of a memory system according to a second embodiment;

FIG. 13 is a flow chart showing an authentication flow of the memory system according to the second modification;

FIG. 15 is a block diagram showing a configuration example of a memory system according to a third embodiment;

FIG. 17 is a block diagram showing a configuration example of a memory system according to a third modification;

FIG. 18 is a flow chart showing an authentication flow of the memory system according to the third modification;

FIG. 22 is a block diagram showing a system downloading FKB according to the fourth embodiment;

FIG. 25 is a flow chart showing an authentication flow of the memory system according to the fifth embodiment;

FIG. 26 is a diagram illustrating a write process of secret information by a NAND vendor according to the fifth embodiment;

DETAILED DESCRIPTION

Figure 4:
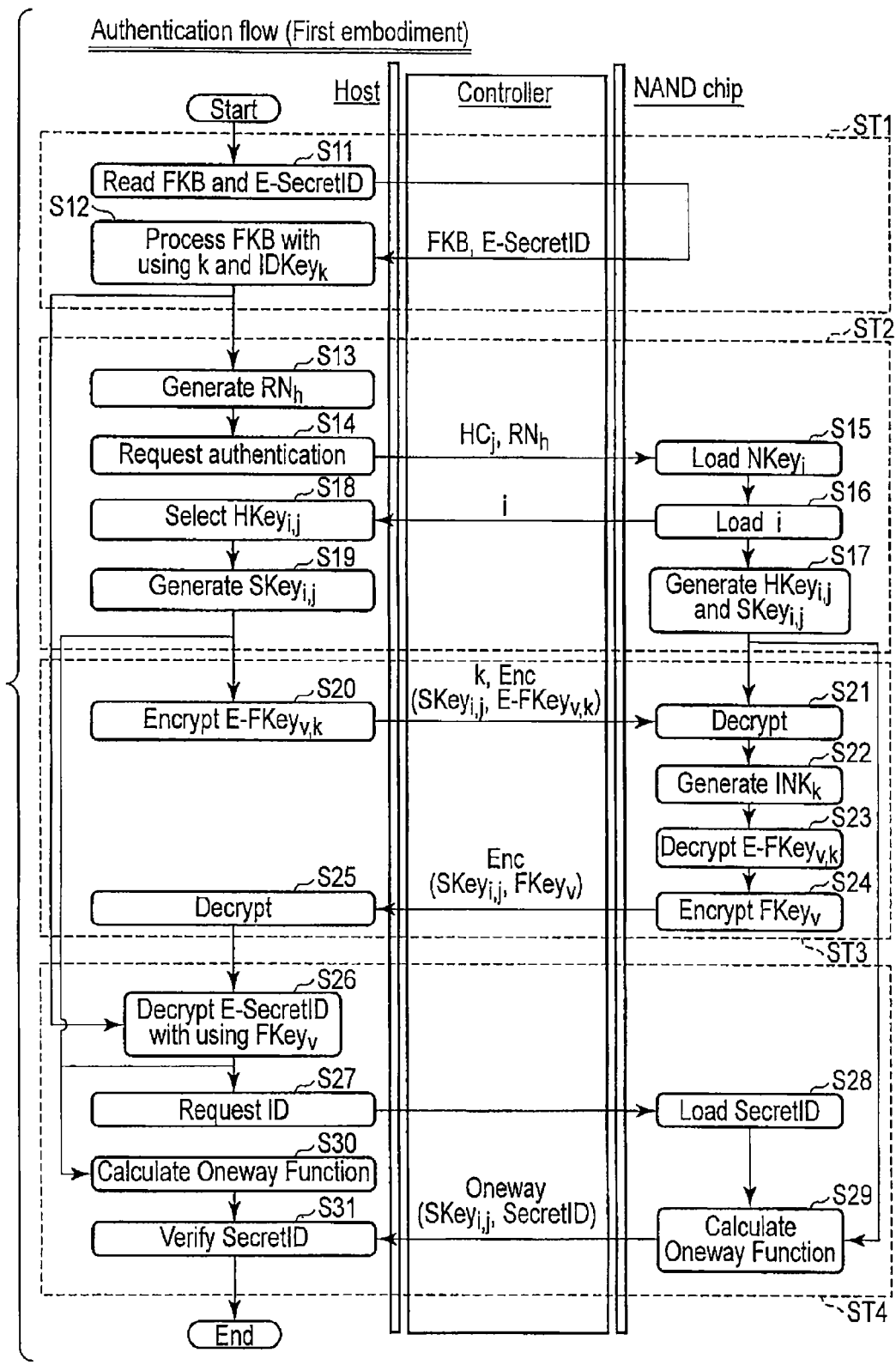
FIG. 4 is a flow chart showing an authentication flow of the memory system according to the first embodiment.

In general, according to one embodiment, a method of authenticating a semiconductor memory device by a host device is disclosed. The semiconductor memory device stores hidden first key information (NKey), hidden secret identification information which is unique to the device (SecretID), encrypted secret identification information (E-SecretID), and key management information (FKB: Family Key Block) commonly attached. The host device stores hidden identification key information (IDKey) and index information (k). The host device reads the encrypted secret identification information (E-SecretID) and the key management information (FKB) from the semiconductor memory device. The host device obtains specific encrypted management key (E-FKey) from the key management information (FKB) by using the index information (k). The encrypted management key (E-FKey) is able to be decrypted using the identification key information (IDKey). The host device transmits the index information (k) which indicates a selected store location of the encrypted management key (E-FKey) in the key management information (FKB) and the encrypted management key (E-FKey) to the semiconductor memory device. The semiconductor memory device generates an index key (INK) using the first key information (NKey) and the received index information (k). The semiconductor memory device decrypts the encrypted management key (E-FKey) using the index key (INK) to obtain and transmit management key (FKey) to the host device.

A plurality of embodiments will be described below with reference to drawings. In the description below, a memory system is taken as an example of a host device, a semiconductor memory device and an authentication method, however the embodiments are not limited to such an example. In the description below, common parts are denoted by like reference numerals throughout the drawings.

First Embodiment

A host device, a semiconductor memory device and an authentication method according to a first embodiment will be described.
<1. Configuration Example (Memory System)>
A configuration example of a memory system according to the first embodiment will be described by using FIG. 1.

As shown in FIG. 1, the memory system according to the first embodiment includes a NAND flash memory 10 as an authenticatee, a host device 20 as an authenticator, and a controller 19 mediating therebetween. The host device 20 accesses the NAND flash memory 10 via the controller 19. Here, a manufacturing process of a semiconductor product such as the NAND flash memory 10 will briefly be described. The manufacturing process of a semiconductor product can mainly divided into a preprocess to form a circuit on a substrate wafer and a postprocess to cut the wafer to individual pieces and then to perform wiring and packaging a piece in a resin. The controller 19 is configured in various ways such being configured to be included in the NAND flash memory 10 in the preprocess, configured to be included in the same package in the postprocess, though not included in the preprocess, and provided as a different chip from the NAND flash memory 10. The description below including FIG. 1 is provided by taking a case when the controller 19 is provided as a different chip from the NAND flash memory 10 as an example. If not mentioned specifically below, the controller 19 mediates between the host device 20 and the NAND flash memory 10 in many cases to exchange data and instructions therebetween. Even in such a case, the controller 19 does not change intrinsic content of the above data and instructions and thus, details may be provided below as an abbreviated description. Details of configuration examples of the NAND flash memory 10 and the controller 19 will be provided later.

If the host device 20 is configured as dedicated hardware like a consumer device, not only a case where the device is configured by combining dedicated hardware with firmware to operate the dedicated hardware, but also a case where all functions of the device are realized by software operating in a PC can be assumed. The present embodiment can basically be applied regardless of which configuration the host device 20 adopts.

Each component and data processing shown in FIG. 1 will be described below. The present embodiment shows the method of reading secret identification information SecretID recorded in NAND type flash memory 10 as an authenticatee in a state hidden from third parties and also firmly verifying that the data has been read from an authentic authenticatee and a configuration example when the method is applied to a memory system using the NAND flash memory 10.
1-1. NAND Flash Memory
In the present embodiment, the NAND flash memory 10 is an authenticatee as described above. As shown in FIG. 1, the NAND flash memory 10 according to the present embodiment includes a cell array 11, data caches 12A, 12B and 12C and an authentication circuit 17 disposed in a peripheral area of the cell array 11.

The cell array 11 includes a read/write area 11-1 permitted to read and write into from outside, a hidden area 11-2 inhibited from both reading and writing into from outside, and a ROM area 11-3 inhibited from writing into from outside.

The read/write area 11-1 is an area into which data can be written and from which data can be read from outside the NAND flash memory 10. In the read/write area 11-1, key management information FKBv (Family Key Block) that is a multiply-encrypted FKey pack and index information (index of NKey) for indicating secret information (first key information) NKeyi prepared to hide FKeyv is stored. In contrast to other data recorded in the NAND flash memory 10, the key management information FKBv may be recorded when the NAND flash memory 10 is fabricated, or when the storage media such as SD card (registered trademark) for general user is fabricated by connecting the controller to the NAND flash memory 10. Alternatively, FKBv may be downloaded from a server in accordance with a user's request after shipping. Details thereof will be described below.

The key management information (FKBv) is encrypted data prepared to decrypt hidden information (FKeyv) by performing a first stage decryption process using identification key information (IDKeyk, to be described later) which is secret information held by the host 20, and index information (k) of such identification key information (IDKeyk) or identification information of the host 20, and performing a second stage decryption process using the secret key information (first key information) NKey held by the NAND flash memory. When the index information (k) is used for decrypting FKB, not only the entire index information (k), but its part can be used, depending on the configuration of the index information (k). The key management information FKBv is also information not only prepared uniquely for each of the NAND flash memories 10, but also can be commonly attached to (can be associated with) a plurality of the NAND flash memories 10 such as the production lot unit or wafer unit of the NAND flash memories 10 in accordance with the manufacturing process. Index information v of the key management information FKBv may be identification information or version number information of the key management information (FKBv).

The hidden area 11-2 is an area inhibited from both reading and writing into from outside the NAND flash memory 10. In the hidden area 11-2, secret information (first key information) NKeyi used by the NAND flash memory 10 for an authentication process and secret identification information SecretID of the NAND flash memory 10 are recorded.

The ROM area 11-3 is an area inhibited from writing into from the outside, but is permitted to read data therefrom. In the ROM area 11-3 according to the present embodiment, the encrypted secret identification information (E-SecretID) encrypted by FKeyv specified by the index information v (index of FKey) and the index information v (index of FKey) are recorded. The index information v (index of FKey) is an index to indicate FKeyv hidden by the key management information FKBv stored in the read/write area 11-1. In the present embodiment, data is generally recorded after an error correction code being attached so that, even if an error occurs in data when the index information i or the index information v is recorded, correct identification information can be read. However, to simplify the description, error correction encoding and decoding processes are omitted and not specifically illustrated.

E-SecretID is data obtained by encrypting SecretID attached uniquely to each of the NAND flash memories 10. Alternatively, the same encrypted secret identification information may be recorded in a plurality of NAND flash memories as usage. For example, in pre-recording content distribution, the same content data is recorded in NAND flash memories in advance to sell the NAND flash memories, and the same E-SecretID, which is encrypted secret identification information, is recorded in the NAND flash memories storing the content.

The information stored in the read/write area 11-1 and ROM area 11-3 are stored in a specific location as in the figure for convenience for describing the embodiment; however it is possible to determine to write them in which of the areas if necessary in consideration of the convenience at the time of manufacturing of the NAND, reading from the host device or necessity for the prevention from rewriting from the outside, etc. The details will be described later.

The data caches (Data Cache) 12A, and 12B and 12C temporarily store data read from the cell array 11.

The authentication circuit 17 includes data generators (Generate) 13, 14, and 16, an encryptor (Encrypt) 101, decryptors (Decrypt) 100 and 103, and an one-way converter (Oneway) 15.

The data generators (Generate) 13, 14, and 16 are circuits which perform predetermined operation on input data items to generate output data.

The data generator 13 converts base information (HCj) received from the host device 20 using the above secret information (first key information) NKeyi to generate second key information HKeyi,j.

The data generator 14 converts a random number RNh received from the host device 20 using the HKeyi,j to generate session keys SKeyi,j.

The data generator (Generate 2) 16 converts the index information k which indicates record of the multiply-encrypted (doubly-encrypted) management key (EE-FKey) selected from FKB by the host device 20 using the secret information (first key information) NKeyi to generate an index key (INKk).

As the data generators 13, 14, and 16, the same circuit as the one-way converter 15 described below, a circuit diverting the one-way converter, or an Advanced Encryption Standard (AES) encryptor can be used to make the circuit size smaller as a whole. Similarly, the same circuit can be used repeatedly for two data generators 13 and 14 illustrated as different structural elements to make the data processing procedure easier to understand. For the same reason, the same circuit as the two data generators 13 and 14 can be used as the data generator 16.

The decryptor (Decrypt) is a circuit which decrypts encrypted input data with key data input separately. In the present embodiment, the decryptor (Decrypt) 100 decrypts encrypted data Enc (SKeyi,j, E-FKeyv,k) encrypted with the session keys SKeyi,j and transmitted from the host device 20 using the session keys SKeyi,j.

The decryptor 103 further decrypts encrypted management key (E-FKeyv,k) obtained via decryption with the session keys SKeyi,j using the index key (INKk) generated by the generator 16.

The encryptor (Encrypt) is a circuit which encrypts input data with key data input separately. In the present embodiment, when the encryptor (Encrypt) 101 transmits management key (FKeyv,k) to the host device 20, it encrypts it using the session keys SKeyi,j.

The one-way converter 15 is a circuit which performs a one-way conversion on input data and key data input separately to output one-way converted input data. In the present embodiment, the one-way converter 15 converts the secret identification information (SecretID) read from the hidden area 11-2 by a one-way function using the SKeyi,j generated by the data generator 14 to generate one-way converted identification information Oneway-ID (=Oneway(SKeyi,j, SecretID)). The one-way converter 15 can also be used as the data generator 14 or the like to make, as described above, the circuit size smaller as a whole.

Though not shown, an output unit to output data to be transmitted to the host device 20 via the controller 19 and like are actually arranged as structural elements.

1-2. Host Device

As shown in FIG. 1, the host device 20 according to the present embodiment includes decryptors (Decrypt) 21 and 201, an FKB processor (Process FKB) 22, a memory 23, a random number generator (RNG) 24, a selector (Select 2) 25, a data generator (Generate) 26, encryptor (Encrypt) 200, a one-way converter (One-way) 27, and a data verification unit (Verify) 28. In addition, for example, an error correction processing unit and the like may be included if necessary.

The decryptor (Decrypt) 21 decrypts the data (E-SecretID) input from the NAND flash memory 10 with the management key FKeyv output from the decryptor 201, and outputs the decrypted secret identification information SecretID.

The decryptor (Decrypt) 201 decrypts the encrypted management key (E-FKeyv) received from the NAND flash memory 10 with the session keys SKeyi,j generated by the data generator 26 to obtains the management key FKeyv.

The FKB processor (Process FKB) 22 performs a first decryption on the specific multiply-encrypted (doubly-encrypted) management key EE-FKeyv,k in the key management information (FKBv) transmitted from the NAND flash memory 10 by using the identification key information IDKeyk hidden in the memory 23 and the index information k of IDKeyk, and outputs the encrypted management key E-FKeyv,k as a result of decryption and the index information (k).

The memory 23 stores k, IDKeyk, set of secret information (second key information) HKeyi,j (i=1, . . . , m; j is a fixed value for HKeyi,j), and HCj. At least IDKeyk and set of secret information (second key information) HKeyi,j (i=1, . . . , m) are hidden from outside the host device 20. The Host Constant (i.e, base information) HCj is a constant value data held in the host device 20 in advance to be sent to the NAND flash memory 10 when authentication is requested. Details thereof will be described below.

The random number generator 24 generates and outputs a random number RNh used for an authentication process.

The data selector (Select2) 25 selects secret information (second key information HKeyi,j needed for the authentication process with the NAND flash memory from the set of secret information (second key information) HKeyi,j (i=1, . . . , m; j is a fixed value for HKeyi,j) hidden by the host device 20 by using index information i of NKey read from the data cache 12C of the NAND flash memory 10.

The data generator 26 is an operation unit that generates output data by performing a predetermined operation on a plurality of pieces of input data. In the present embodiment, the data generator 26 generates a session key SKeyi,j by converting RNh generated by the host device 20 by using secret information (second key information) HKeyi,j hidden by the host device 20. As the data generator 26, for example, the above AES encryptor may be used.

The encryptor (Encrypt) 200 encrypt the encrypted management key (E-FKeyv,k) to which the first decryption process has been performed by the FKB processor 22 with the generated session keys SKeyi,j, and transmits it as doubly-encrypted data Enc (SKeyi,j, E-FKeyv,k) and the index information (k) to the NAND flash memory 10.

The one-way converter 27 converts SecretID output from the decryptor 21 by a one-way function using SKeyi,j output from the data generator 26 to generate one-way converted identification information Oneway-ID.

The identification key information IDKeyk and set of secret information (second key information) HKeyi,j are recorded, for example, after being encrypted by a method specific to the manufacturer in an internal dedicated memory if the host device 20 is a dedicated hardware device like a consumer device, held in a state that can be protected from an dishonest analysis by tamper resistant software (TRS) technology if the host device 20 is a program executed in a PC or the like, or hidden in a state after measures to hide the secret information being taken by using the function of a security module if the security module is contained.

The data verification unit (Verify) 28 compares Oneway-ID received from the NAND flash memory 10 and Oneway-ID obtained from the one-way converter 27 in the host device 20 to determine whether both Oneway-IDs match. If both values of the one-way converted identification information Oneway-ID match (OK), the data verification unit 28 determines that SecretID obtained by the decryptor 21 is an authentic ID and delivers the obtained SecretID to subsequent processes. On the other hand, if both values thereof do not match (NG), the data verification unit 28 determines that the SecretID is an illegitimate ID and outputs a message to that effect to subsequent processes.

The controller 19 performs data transfer with the host device 20 by controlling the NAND flash memory 10. Details thereof will be described below.

The configuration example of the memory system is not limited to the one described above. For example, an error correction processing unit (not shown) and other structural elements may be included if necessary.

1-3. Data Store Location

The location in the cell array 11 where the encrypted secret identification information (E-SecretID) is stored is not limited to the above example, and may be as shown in FIG. 2.

As shown in Example 1, it is also possible to store the encrypted secret key information (E-SecretID) in the read/write area 11-1 instead of the ROM area 11-3.

As shown in Example 2, it is also possible to store the encrypted secret identification information (E-SecretID) in the read/write area 11-1, and the index information i (index of NKey) for indicating the secret information (first key information) NKeyi in the ROM area.

It is undesirable to store the information to be stored in the hidden area 11-2 to another area because it is highly confidential. However, other information can be written in either the read/write area 11-1 or ROM area 11-3 if necessary taking into consideration data writing process during manufacture and the convenience during use of data, for example.

1-4. FKB Processor (Process FKB) 22

The FKB processor 22 shown by FIG. 1 can also have the configuration as shown in FIG. 3 specifically. As shown, the FKB processor 22 includes a data selector (Select1) 21-1 and a decryptor (Decrypt) 22-2, and outputs the decrypted data by the decryptor (Decrypt) 22-2 and the index information (k).

The data selector 22-1 in the first stage selects data that can be decrypted by identification key information hidden in the memory 23 by using index information k recorded in the memory 23 from among an multiply-encrypted FKey pack as a key management information (FKBv) read from the NAND flash memory 10 and outputs the selected data to the decryptor 22-2.

The decryptor (Decrypt) 22-2 decrypts multiply-encrypted (doubly-encrypted, in the present embodiment) management key EE-FKeyv selected by the data selector 22-1 using the IDKeyk hidden in the memory 23 by the host 20 to obtain encrypted management key E-FKeyv,k. In other words, the decryptor 22-2 performs the first stage decryption process.

<2. Authentication Flow>

Next, the authentication flow of a memory system according to the first embodiment will be described along FIG. 4. As shown in FIG. 4, the authentication flow of the present embodiment roughly includes four step groups ST1 to ST4.

(Step S11)

When the authentication is started (Start), the host device 20 reads a multiply-encrypted (doubly-encrypted, in the present embodiment) management key FKey pack as a key management information (FKB: Family Key Block), and encrypted secret identification information (E-SecretID) from the NAND flash memory 10.

(Step S12)

Subsequently, the host device 20 selects an appropriate multiply-encrypted management key FKey (an entry of FKB) by executing a data selection process by the data selector (Select 1) 22-1 from the key management information FKB and also obtains encrypted management key E-FKey by performing decryption by the decryptor 22-2 using identification key information IDKeyk and the index information k.

(Step S13)

Subsequently, the host device 20 generates a random number RNh needed for an authentication request. By using RNh for the authentication process, a shared key that is different each time with the NAND flash memory 10 can be used for processes below.

(Step S14)

Subsequently, the host device 20 sends out a host constant value data (base information) HCj held in advance and the RNh to the NAND flash memory 10 along with an authentication request (Request authentication).

(Step S15)

Subsequently, the NAND flash memory 10 loads NKeyi (i=1, ..., m) from the hidden area 11-2, which are stored in the data cache 12B.

(Step S16)

Subsequently, the NAND flash memory 10 loads to the data cache 12C the index information i of NKey needed for the host device 20 to select the secret information (second key information) HKeyi,j needed for the authentication process with the NAND flash memory 10 from the set of secret information (second key information) HKeyi,j (i=1, ..., m), and sends it out to the host device 20.

(Step S17)

Subsequently, the NAND flash memory 10 generates HKeyi,j through a data generation process in the data generator 13 using the hidden NKeyi and the received host constant value data (base information) HCj. Along with this, it generates the session key data SKeyi,j through a data generation process in the data generator 14 using the received random number RNh (=Generate (HKeyi,j, RNh)).

(Step S18)

In parallel with step S17, the host device 20 selects the secret information (second key information) HKeyi,j needed for the authentication process with the NAND flash memory 10 from the set of secret information (second key information) HKeyi,j (i=1, ..., m) which is hidden in host device 20 using the received index i.

(Step S19)

Subsequently, the host device 20 generates a SKeyi,j (=Generate(HKeyi,j, RNh)) by a data generation process of the data generator 26 using the selected secret information (second key information) HKeyi,j and the generated RNh.

(Step S20)

Subsequently, the host device 20 sends out to the NAND flash memory 10 the index information k for indicating the record number (store location) of the multiply-encrypted management key selected from the FKB in step S12 and the data Enc(SKeyi,j, E-FKeyv,k) which is the encrypted management key E-FKeyv,k with using the session key data SKeyi,j. Depending on the configuration of the identification information (k), the whole identification information (k) is not transmitted, instead, a part of the identification information (k) without information not needed for generation of the index key INKk in the NAND flash memory may be transmitted.

(Step S21)

Subsequently, the NAND flash memory 10 decrypts the encrypted management key Enc(SKeyi,j, E-FKeyv,k) which has been encrypted with using the session key data SKeyi,j to obtain an encrypted management key E-FKeyv,k.

(Step S22)

Subsequently, the NAND flash memory 10 generates the index key INKk using NKeyi and the index information k.

(Step S23)

Subsequently, the NAND flash memory 10 decrypts the encrypted management key E-FKeyv,k with using the index key INKk to obtain the management key FKeyv,k.

(Step S24)

Subsequently, the NAND flash memory 10 encrypts the management keys FKeyv,k with using the session keys SKeyi,j and sends out the encrypted data Enc(SKeyi,j, FKeyv, k) to the host device 20.

(Step S25)

Subsequently, the host device 20 decrypts the encrypted management key with using the session key SKeyi,j to obtain the management key Fkeyv,k.

(Step S26)

Subsequently, the host device 20 decrypts the encrypted secret identification information E-SecretID read from the NAND flash memory 10 using the obtained management key Fkeyv,k to obtain the secret identification information SecretID.

(Step S27)

Subsequently, the host device 20 transmits an ID request (Request ID) to the NAND flash memory 10.

(Step S28)

Subsequently, the NAND flash memory 10 reads the secret identification information SecretID from the hidden area 11-2 and stores it in the data cache 12A.

(Step S29)

Subsequently, the NAND flash memory 10 generates one-way converted identification information Oneway-ID (=Oneway(SKeyi,j, SecretID)) by executing a one-way conversion process of the one-way converter 15 on the SecretID using the SKeyi,j, and transmits the generated Oneway-ID to the host device 20.

(Step S30)

In parallel with step S29, the host device 20 executes the one-way conversion process on the SecretID in the one-way converter 27 using the generated SKeyi,j to obtain the one-way converted data Oneway-ID.

(Step S31)

Subsequently, the host device 20 determines whether the Oneway-ID received from the NAND flash memory 10 and the Oneway-ID generated by the host device 20 match. If both values of the Oneway-ID match (OK), the host device 20 determines that the SecretID obtained by the decryptor 21 is an authentic ID and passes the SecretID to subsequent processes. On the other hand, if both values thereof do not match (NG), the host device 20 determines that the SecretID is an illegitimate ID and outputs a message to that effect.

With the above operation, the authentication flow according to the first embodiment is completed (End).

Incidentally, the procedure of the present embodiment is not limited to the described one, and the order of the processes may vary so long as the processes shown in FIG. 1 can be consistently executed.

Moreover, in the above procedure steps, the same session key Skeyi,j generated in step ST2 is used in both the step ST3 and step ST4; however, it is possible to execute step ST2 again before step ST4 and use different session keys in steps ST3 and ST4.

<3. FKB (Family Key Block)>

Next, key management information FKB (Family Key Block) according to the first embodiment will be described in more detail by using FIG. 5.

A process to generate key management information FKB conforming to the NAND flash memory 10 in which the secret identification information SecretID according to the present embodiment is recorded is as follows.

First, the index key INKk (k=1, . . . , n) is generated by a predetermined generation algorithm in the generator 16 using the index k corresponding to each IDKeyk of IDKeyk's (k=1, . . . , n) (Set of IDKeyk's) which are the secret key information prepared in advanced and secret information (first key information) NKeyi hidden in the NAND flash memory 10 which stores FKB prepared to protect the management key FKeyv:

INKk=Generate2(NKeyk, k) (k=1, . . . , n).

Subsequently, in order to protect the FKeyv, the FKeyv is encrypted as the single encryption using each generated index key INKk (k=1, . . . , n) to obtain encrypted management key E-FKeyv,k=Encrypt(INKk, FKeyv) (k=1, . . . , n).

Subsequently, one piece of encrypted management key E-FKeyv,k to which the index (k) corresponds is encrypted after another as the double encryption (Encrypt) using one IDKeyk (k=1, . . . , n) (Set of IDKeyi's) after another as identification key information prepared in advance.

Thus, the key management information FKB according to the present embodiment is a set of multiply-encrypted (doubly-encrypted) management key EE-FKeyv,k=Encrypt(IDKeyk, E-FKeyv,k) (k=1, . . . , n). The set of the multiply-encrypted FKeyv,k is called an multiply-encrypted management key (FKey) pack.

Incidentally, to indicate encrypted (Encrypt) data, it is described as "E–", and to indicate further-encrypted data, it is described as "EE–".

Incidentally, the configuration of the key management information FKB is not limited to the configuration in the present embodiment. For example, in case where the specific IDKeyi is leaked, to disable the host device which holds the IDKeyi from decrypting FKey from the multiply-encrypted Fkey pack, the corresponding encrypted FKeyv (EE-FKeyv,k in the above example) which can be decrypted from the leaked IDKeyk is deleted from the FKB. As a result, when the host device 20 which has the leaked IDKeyk accesses the NAND flash memory 10 with the newly configured FKB, the host device 20 cannot obtain (decrypt) correct FKeyv and SecretID. In this manner, the function to revoke the host device 20 holding the leaked identification key information IDKeyk can be provided.

Further, the method of generating the key management information FKB is not limited to the method in the present embodiment. For example, the function to revoke the host device 20 can also be provided if the key management information FKB is generated by using the key management information multiply-encrypted as in the present embodiment and conventional MKB (Media Key Block) technology used in CPRM or another MKB technology.

The MKB technology efficiently shares common secret information (Media Key) (among devices not to be revoked) while realizing device revocation in a situation in which each of a plurality of devices has a mutually different piece of secret information and is also called Broadcast Encryption.

<Advantageous Effects>

According to the host device, semiconductor memory device and authentication method according to the first embodiment, at least the following advantageous effects (1) to (4) can be obtained.

(1) Even if secret information has leaked from the host device 20, it is possible to prevent illegitimate use of secret information of the NAND flash memory 10 using the leaked information.

The host device 20 as an authenticator may be provided, as described above, not only as a dedicated hardware device such as a consumer device, but also, for example, as a program (software) executable in a personal computer (PC) or the like, and, in some cases, the software functions as a substantial host device. On the other hand, the NAND flash memory 10 as an authenticatee is recording media. Even in the case where a program called "firmware" mediates, an important process or information is stored in a hidden state in hardware in the cell array 11. Thus, there is concern that the tamper-resistance (the resistance to attacks) of software executed in a PC becomes lower, compared to the recording media. Thus, there is concern that, by attacking the host device (authenticator) 20 with a low tamper-resistance, secret information hidden in the NAND flash memory (authenticatee) 10 with a high tamper-resistance is also exposed, leading to a disguise as a device with a high tamper-resistance. Thus, in the configuration according to the first embodiment and the authentication method therefor, as described above, the NAND flash memory 10 with a relatively high tamper-resistance hides first key information (NKeyi) from which second key information (HKeyi,j) can be generated therefrom in the cell array 11. On the other hand, the host device 20 hides only the second key information (HKeyi,j) from which the first key information (NKeyi) cannot be generated therefrom in the memory 23.

Thus, the NAND flash memory 10 generates the second key information (HKeyi,j) hidden by the authenticator 20 by using the base information HCj received from the host device 20 and the first key information (NKeyi) hidden by the NAND flash memory 10. The NAND flash memory 10 further generates a session key SKeyi,j using the second key information (HKeyi,j) and the random number information RNh.

The host device 20 generates a session key SKeyi,j using the second key information (HKeyi,j) selected by the index information i and the random number information RNh. As a result, the NAND flash memory 10 and host device 20 share the same session key SKeyi,j.

Thus, in the present embodiment, the secret level of information hidden by the NAND flash memory (authenticatee) 10 and the secret level of information hidden by the host device (authenticator) 20 can be made asymmetric. In the present embodiment, for example, the secret level of information hidden by the NAND flash memory 10 with a relatively high tamper-resistance can be set higher than the secret level of information hidden by the host device 20 with a relatively low tamper-resistance.

Thus, even if information hidden by the host device 20 has leaked, the NAND flash memory 10 cannot be "disguised (or cloned)" by using the leaked information because the secret level of information hidden by the NAND flash memory 10 with a relatively high tamper-resistance is higher. Therefore, illegitimate use of secret information of the NAND flash memory 10 using the leaked information can advantageously be prevented. As a result, for example, it becomes possible to reliably confirm that ID information read by the host device 20 is information that has been read from the intended authenticatee 10 and to revoke the remote parties who illegitimately use the ID.

(2) Even if the identification key information IDKeyk leaked from the host device is illegitimately used, it is possible to reduce the work to identify the leaked IDKeyk.

Figure 5:
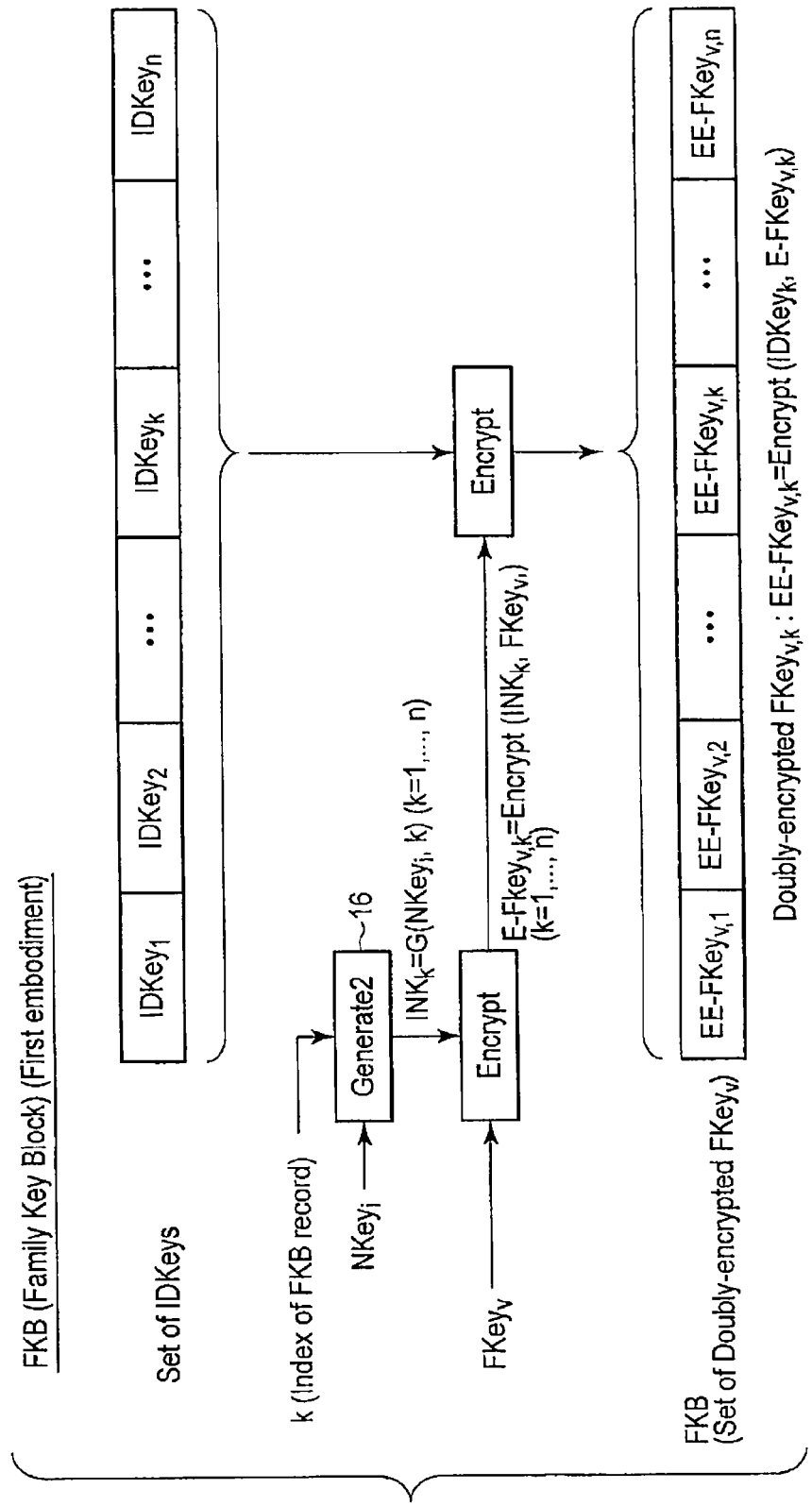
FIG. 5 is a diagram showing a configuration example of an encrypted FKey pack (FKB) according to the first embodiment.

The key management information FKB according to the present embodiment is a set of doubly-encrypted management key EE-FKeyv,k=Encrypt(IDKeyk, E-FKeyv,k) (k=1, . . . , n) as multiple encryption as shown in FIG. 5.

Therefore, in the present embodiment, the result of the decryption of FKB by the host device 20 is transmitted back to the NAND flash memory 10 in the state of the encrypted data Enc (SKeyi,j, E-FKeyv,k) (step S20). Furthermore, the management key FKey needed for decrypting the encrypted secret identification information (E-SecretID) would not be obtained by the decryptor 100 without performing a decryption process (step S21). Thus, it is provided a response process (ST3) for authentication on which (k) of the record in n doubly-encrypted management keys EE-FKeyv in FKB is processed in the FKB processor 22 of the host device 20, and it is configured that the index information (k) must be transmitted to the NAND flash memory 10. Therefore, a licensing administrator etc. can identify the identification key information IDKeyk actually illegitimately-used with checking the index information (k) of IDKeyk currently used.

(3) Confidentiality can be maintained.

As described above, in authentication operation, the response process (ST3) between the host device 20 and NAND flash memory 10 is performed with data in an encrypted state. For example, in step S20, the result of FKB decrypted by the host device 20 is transmitted back to the NAND flash memory 10 in the state of the encrypted data Enc (SKeyi,j, E-FKeyv,k). Moreover, in step S24, the NAND flash memory 10 encrypts the management key Fkeyv,k using the session key Skeyi,j, and sends it out in a state of the encrypted data Enc (SKeyi,j, FKeyv,k) to the host measure 20.

Therefore, confidentiality can advantageously maintained.

(4) Advantages for implementation

In a configuration like the present embodiment, as described above, restrictions are also imposed on circuit scales, for example, in an environment in which hardware implementation of a public key cryptosystem process or an MKB process, which requires a relatively large circuit scale, is difficult to achieve. That is, a relatively large scale circuit is required for a public key cryptosystem process or an MKB process. On the other hand, a circuit size has been limited and hardware implementation has been difficult.

However, according to the present embodiment, though the key information is asymmetric, there is no need to use the public key cryptosystem process requiring a relatively large circuit scale. Further, by making the secret levels of information hidden by the host device (authenicator) 20 and the NAND flash memory (authenticatee) 10 asymmetric as described above, authentication means is implemented by which with information leaked from one device alone, the other device cannot be disguised (cloned) and the session key SKeyi,j is shared by the authenticator 20 and the authentacee 10.

Thus, implementation can be said to be advantageous even in a severe environment in which the above restrictions are imposed.

Further, as described above, the circuit scale can be further reduced by sharing the data generator and encryptor in a memory system as the same process.

This regard will be described in detail in the following first to third modifications which use Advanced Encryption Standard (AES).

[First Modification (AES Encryption Used)]

Next, a host device, a semiconductor memory device and authentication method according to a first modification will be described. In the description, overlapping points with the first embodiment will be omitted.

The present modification is an example of where the first embodiment is implemented using the Advanced Encryption Standard (AES) cipher which is a common key cipher.

<Common Key Encryption Application>

In the common key cipher represented by the Advanced Encryption Standard (AES) cipher or the Data Encryption Standard (DES) cipher, the algorithm of encryption and decryption is specified by the standardization organization. For example, in order to decrypt the data to which the AES encryption process has been performed, pre-encrypted data (plain text data) can be obtained by sharing the key used for encryption (encryption key) and performing "an AES decryption process" which makes a pair with the AES encryption process. Thus, although encryption process and decryption process of the common key cipher are used as a pair, in a general common cipher algorithm, it is also possible to replace the encryption process and decryption process with each other as with the AES cipher or DES cipher.

For example, if the AES cipher is taken for an example, a function equivalent to the above encryption and decryption processes is realizable by using the AES decryption (AES_D) for "the encryption process", and using the AES encryption (AES_E) for "decryption process".

Specifically, the encryption/decryption process can be expressed as follows.

Chiper_Text=AES_E(Key, Plain_Text),
Plain_Text=AES_D(Key, Cipher_Text)=AES_D(Key, AES_E(Key, Plain_Text))

Assume that Chiper_Text is the original input data (plain text data), and Plain_Text is the output data (encrypted data), then Plain_Text (output) converted from Cipher_Text (input) is obtained by processing Plain_Text=AES_D (Key, Cipher_Text).

When this Plain_Text is given to the AES encryption process (AES_E) as the input data, it is expressed as follows.

AES_E (Key, Plain_Text)=Cipher_Text

That is, Cipher_Text (output) is obtained. This Cipher_Text is the data input to the AES decryption process (AES_D), and it can be seen that it correctly returns to the original data. As described above, in the common key encryption such as the AES cipher, encryption or decryption is the data conversion processes, and it is clear that the same advantage can be obtained even if the order is replaced. Thus, in the present modification, a description is given of an example where the AES cipher is used, the decryptors (Decrypt) 100, 101, and 103 in the NAND flash memory 10 are implemented as respective AES encryption processes (AES_E), and the encryptors (Encrypt) 200, 201, and 21 in the host device 20 are implemented as respective AES decryption processes (AES_D).

<Memory System>

Figure 6:
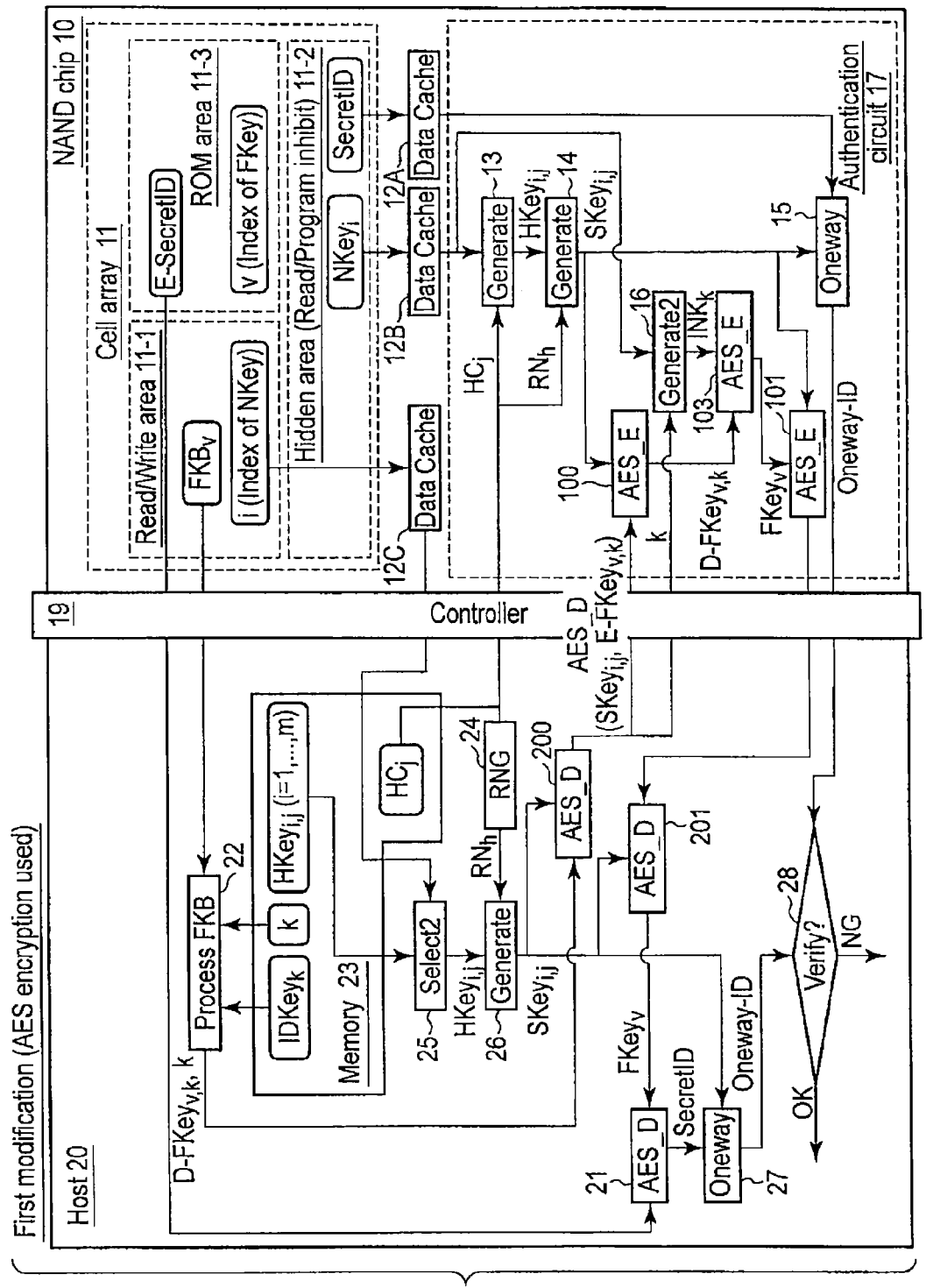
FIG. 6 is a block diagram showing a configuration example of a memory system according to a first modification.

The memory system according to the first modification is as shown in FIG. 6.

As shown in FIG. 6, in the present modification, the AES cipher is used, and the decryptors (Decrypt) 100 and 103 and encryptor 101 in the NAND flash memory 10 are implemented as respective AES encryption processes (AES_E), and the encryptor (Encrypt) 200 and decryptors 201 and 21 in the corresponding host device 20 are implemented as respective AES decryption processes (AES_D). Thus, although the labels are different from those for the first embodiment, there is no difference in the function.

<Authentication Operation>

Figure 7:
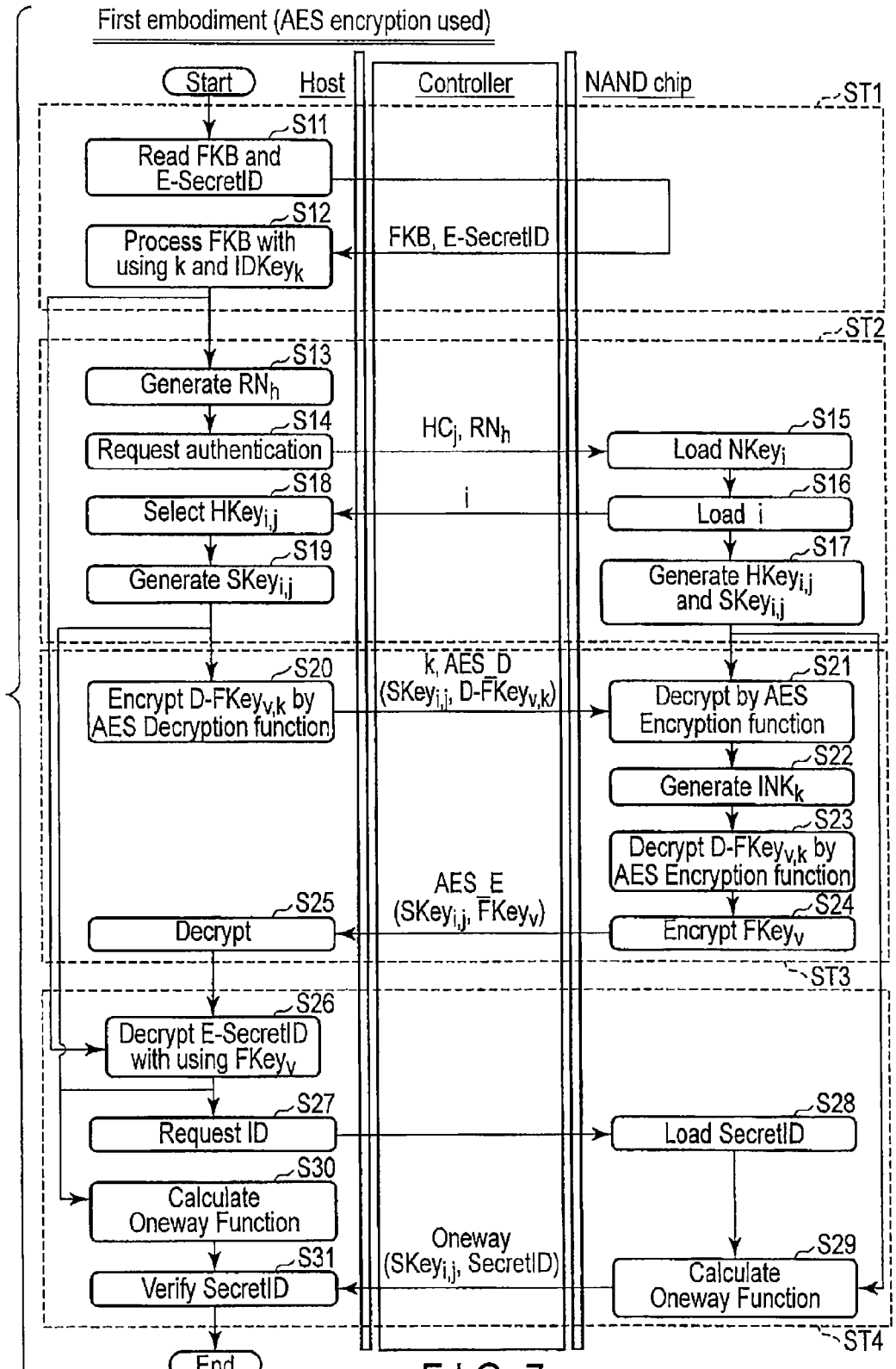
FIG. 7 is a flow chart showing an authentication flow of the memory system according to the first modification.

The authentication flow according to the first modification is as shown in FIG. 7. As shown in FIG. 7, the present modification is different from the first embodiment in using the AES encryption in step group ST3 as follows.

(Step S20)

First, in step S20, the host device 20 encrypts the encrypted management key D-FKeyv,k using the AES decryption function (Encrypt D-FKeyv,k by AES Decryption function), and sends out the encrypted data AES_D (SKeyi,j, D-FKeyv,k) and index information k to the NAND flash memory 10. Incidentally, "D-" indicates that the data following it has been converted using the AES decryption process.

(Step S21)

Subsequently, NAND flash memory 10 decrypts the encrypted data AES_D (SKeyi,j, D-FKeyv,k) using the AES encryption function (Decrypt by AES Encryption function) to obtain the encrypted management key D-FKeyv,k.

(Step S22)

Subsequently, the NAND flash memory 10 generates the index key INKk using NKeyi and the index information k.

(Step S23)

Subsequently, the NAND flash memory 10 decrypts the encrypted management key D-FKeyv,k using the index key INKk and AES encryption function (Decrypt by AES Encryption function) to obtain the management key Fkeyv,k.

(Step S24)

Subsequently, the NAND flash memory 10 encrypts the management key Fkeyv,k using Skeyi,j and AES encryption function, and sends out the encrypted data AES_E (SKeyi,j, FKeyv,k) to the host measure 20.

<FKB (Family Key Block)>

Figure 8:
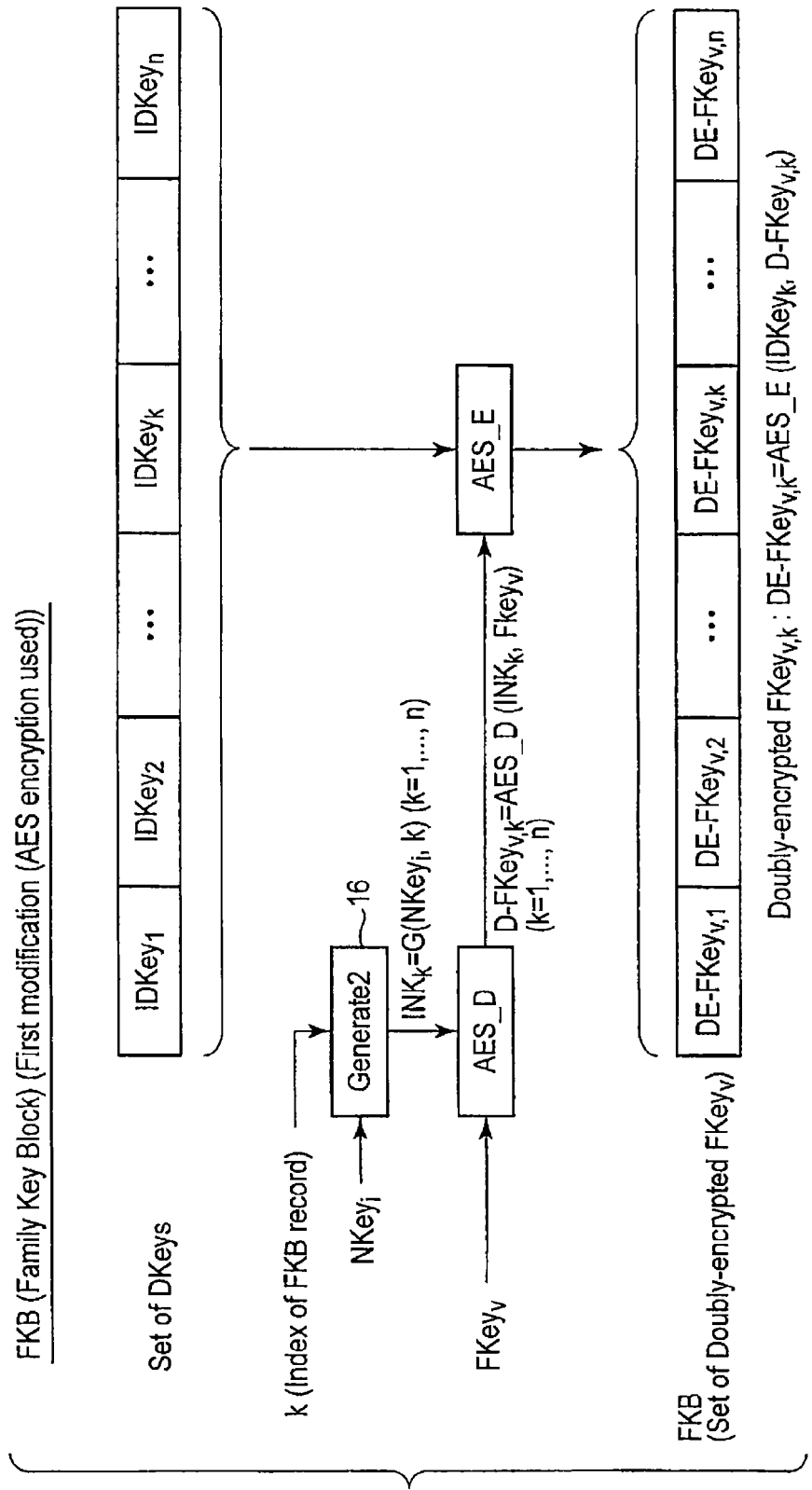
FIG. 8 is a diagram showing a configuration example of an encrypted FKey pack (FKB) according to the first modification.

Next, key management information FKB (Family Key Block) according to the first modification will be described in more detail by using FIG. 8.

The process for generating the key management information FKB using the AES encryption according to the present modification is as follows.

First, the index key INKk (k=1, . . . , n) is generated as described above.

Subsequently, the FKeyv to be hidden is encrypted as the single encryption using the AES decryption process and each generated index key INKk (k=1, . . . , n) to obtain encrypted management key D-FKeyv,k=AES_D (INKk, FKeyv) (k=1, . . . , n).

Subsequently, one encrypted management key D-FKeyv,k to which the index (k) corresponds is encrypted after another as the double-encryption (Encrypt) using the AES encryption process and one IDKeyi (i=1, . . . , n) (Set of IDKeyi's) after another as identification key information prepared in advance.

Thus, the key management information FKB according to the present modification is a set of multiply-encrypted (doubly-encrypted) management key DE-FKeyv,k=AES_E (ID-Keyk, D-FKeyv,k) (k=1, . . . , n) using the AES encryption processes. The set of the multiply-encrypted FKeyv,k is called an multiply-encrypted management key (FKey) pack.

Incidentally, to indicate encrypted (Encrypt) data using the AES encryption process or decrypted (Decrypt) data using the AES decryption process, each of them is described as "E-" or "D-", respectively.

Since other configurations and operations are substantially the same as those of the first embodiment, detailed description is omitted.

<Advantageous Effects>

As described above, according to the host device, semiconductor memory device, and authentication method according to the first modification, the same advantages as at least the above (1) to (4) can be obtained.

Furthermore, in the present modification, the memory system is implemented using the AES encryption which is a common key cipher.

Thus, the encryption and decryption processes which must be implemented in the NAND flash memory 10 are integrated into the AES encryption process, which can advantageously reduce implementation load (circuit size) of the NAND flash memory 10 compared with implementation of the both of the encryption process and decryption process.

Furthermore, as described above, the data generators (Generate) 13 and 14 can be the AES encryption process, and the one-way converter (One-way) 15 can be composed by using the AES encryption process. In this case, it is also possible to reduce further implementation load (circuit scale) needed for process by the NAND flash memory 10.

Moreover, although in the present modification the description has been made to an example where the decryptor (Decrypt) 21 in the host device 20 is implemented as the AES decryptor (AES_D), the decryptor (Decrypt) 21 in the host device 20 can be implemented as the AES encryptor (AES_E). In this case, E-SecretID=AES_D (FKeyv, SecretID) is recorded in the ROM area 11-3 according to the first embodiment. Moreover, in step S26 of the first embodiment, the host device 20 obtains the secret identification information SecretID by encrypting encrypted secret identification information E-SecretID read from the NAND flash memory 10 using the obtained management key FKeyv,k. This is indeed applicable to each embodiment and a modification.

Second Embodiment

FKB Triply-Encrypted

A host device, a semiconductor memory device, and an authentication method according to the second embodiment will be described. The present embodiment relates to an example where the key management information FKBv is triply-encrypted management keys EEE-FKeyv,k=Encrypt (IDKeyk, EE-FKeyv,k) (k=1, . . . , n) as multiple encryption. In the following description, overlapping points with the first embodiment will be omitted.

<Memory System>

The memory system according to the second embodiment is as shown in FIG. 9.

In the present embodiment, the key management information FKBv is triply-encrypted management key pack EEE-FKeyv,k=Encrypt (IDKeyk, EE-FKeyv,k) (k=1, . . . , n) as multiple encryption.

Therefore, as shown in FIG. 9, the host device 20 is different from that of the first embodiment in that it further includes a decryptor 202.

The decryptor (Decrypt) 202 decrypts the encrypted management key (E-FKeyv) received from the decryptor 201 using the identification key information IDKeyk to obtain the management key FKeyv.

<Authentication Operation>

Figure 10:
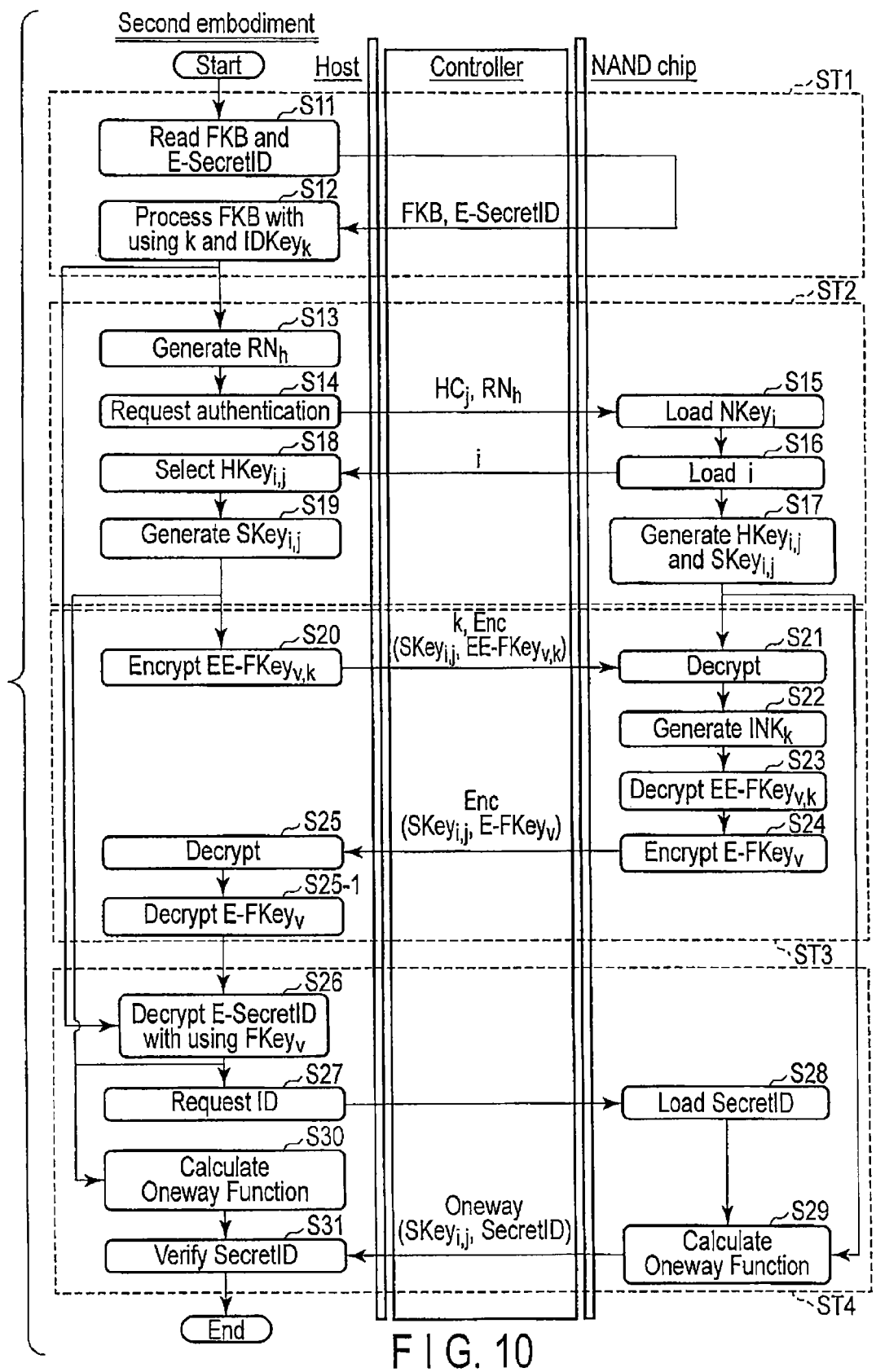
FIG. 10 is a flow chart showing an authentication flow of the memory system according to the second embodiment.

The authentication flow of the memory system according to the second embodiment is as shown in FIG. 10.

As shown in FIG. 10, the present embodiment is different from the first embodiment in points associated with the key management information FKBv being triply-encrypted EEE-FKeyv,k as multiple encryption. It is substantially different in that it further includes the following step S25-1.

(Step S25-1)

The host device 20 decrypts the encrypted management key (E-FKeyv,k) received from the decryptor 201 using the identification key information IDKeyk in the decryptor 202 to obtain the management key Fkeyv,k.

Since other configurations and operations are substantially the same as those of the first embodiment, detailed description is omitted.

<FKB (Family Key Block)>

Next, key management information FKB (Family Key Block) according to the second embodiment will be described in more detail by using FIG. 11.

Figure 11:
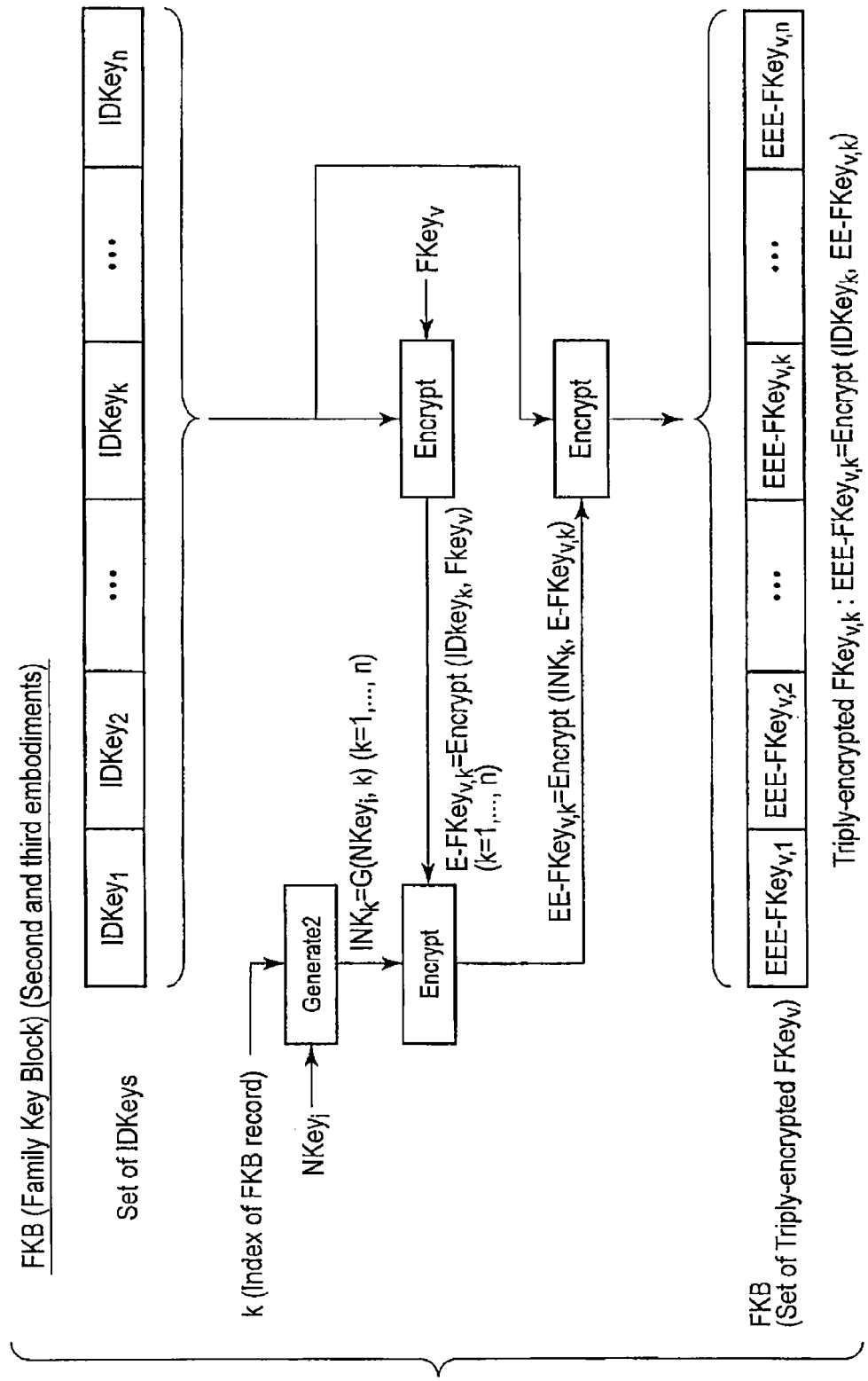
FIG. 11 is a diagram showing a configuration example of an encrypted FKey pack (FKB) according to the second embodiment.

As shown in FIG. 11, in order to generate the triply-encrypted key management information FKB in the present embodiment, an encryption process is further added.

First, the index key INKk (k=1, . . . , n) is generated by a predetermined generation algorithm in the generator 16 using the index k corresponding to each IDKeyk of IDKeyk's (k=1, . . . , n) (Set of IDKeyk's) which are the secret key information prepared in advanced and secret information (first key information) NKeyi hidden in the NAND flash memory 10 which stores FKB prepared to protect the management key FKeyv:

INKk=Generate2(NKeyi, k) (k=1, . . . , n).

FKeyv is encrypted as the single encryption using each identification key information IDKeyk (k=1, . . . , n) to obtain encrypted management key E-FKeyv,k=Encrypt(IDkeyk, FKeyv) (k=1, . . . , n).

Subsequently, each encrypted management key E-FKeyv,k to which another as the double encryption (Encrypt) using one INKk (k=1, . . . , n) after another as index key prepared in advance.

Subsequently, as triple-encryption, each doubly-encrypted management key EE-FKeyv,k=Encrypt (INKk, E-FKeyv,k) is encrypted after another by similarly using the identification key information IDKeyk corresponding to each index (k), respectively.

Thus, triply-encrypted management key Triply-encrypted FKeyv,k:EEE-FKeyv,k=Encrypt (IDKeyk, EE-FKeyv,k) (k=1, . . . , n) can be obtained as the key management information FKB according to the present embodiment.

Incidentally, to indicate encrypted (Encrypt) data, it is written as "E-", to indicate doubly-encrypted data, it is written as "EE-", and to indicate triply-encrypted data, it is written as "EEE-" in the figure.

<Advantageous Effects>

As described above, according to the host device, semiconductor memory device, and authentication method according to the second embodiment, the same advantages as at least the above (1) to (4) can be obtained. Furthermore, according to the present embodiment, the following advantage (5) can be obtained.

(5) It is possible to prevent illegitimate obtaining of the management key FKeyv.

In the present embodiment, the key management information FKBv is the management key EEE-FKeyv,k=Encrypt (IDKeyk, EE-FKeyv,k) triply-encrypted as multiple encryption. Therefore, the host device 20 is different from that of the first embodiment in that it further includes the decryptor 202.

According to the above configuration and operation, even if the secret information (first key information) NKeyi has leaked from the NAND flash memory 10, the management key FKeyv cannot be easily obtained only from the leaked NKeyi and information received from the host device 20. Therefore, illegitimate obtaining of the management key FKeyv can be advantageously prevented.

[Second Modification (AES Encryption Used)]

Next, a host device, a semiconductor memory device, and an authentication method according to the second modification are described. The present modification is an example where the second embodiment is implemented using the AES encryption as in the first modification.

<Memory System>

Figure 12:
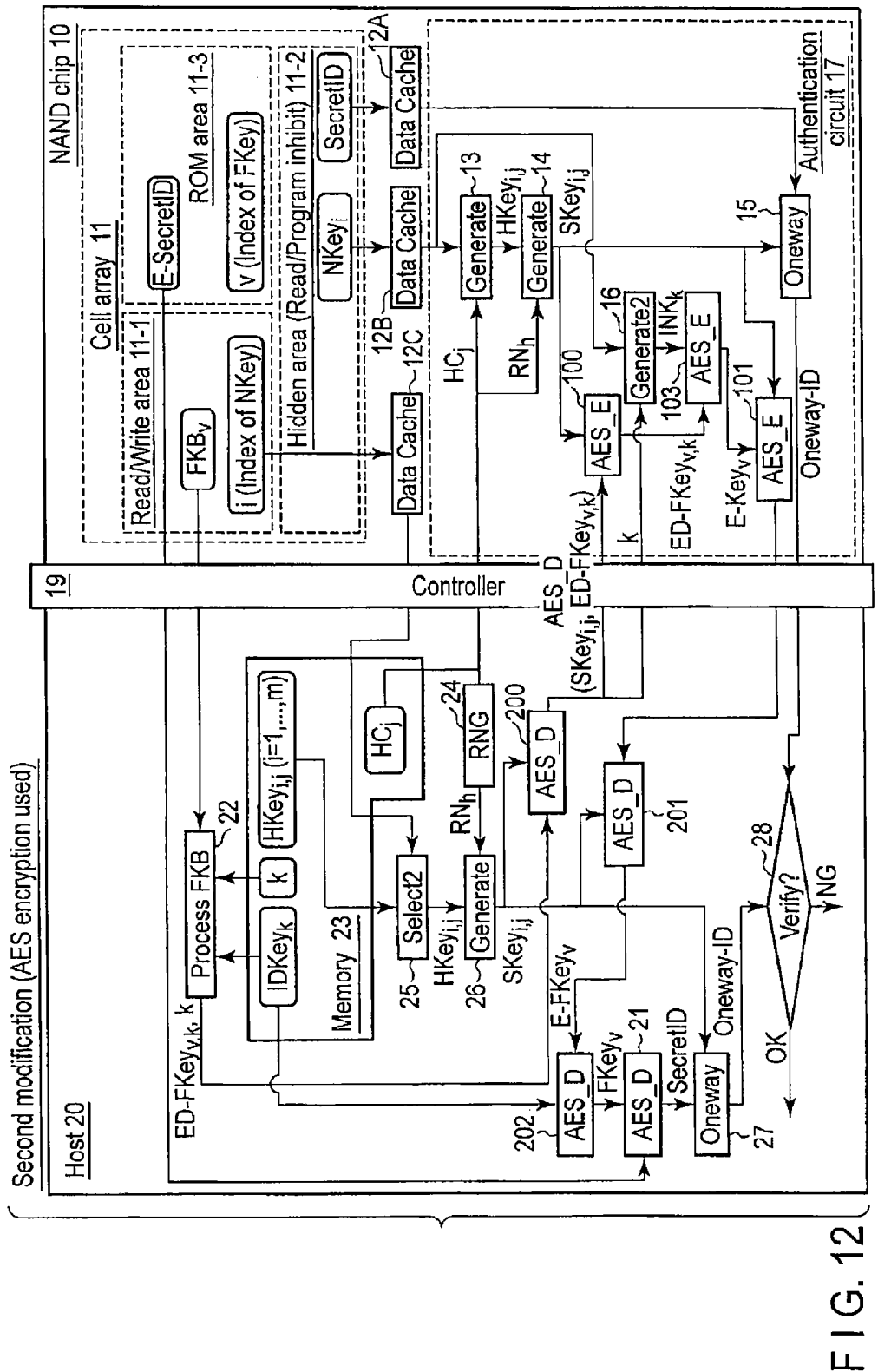
FIG. 12 is a block diagram showing a configuration example of a memory system according to a second modification.

The memory system according to the second modification is as shown in FIG. 12.

The present modification is an example where the second embodiment is implemented using the AES cipher. Therefore, as shown in FIG. 12, the decryptor 202 in the host device 20 is implemented as the AES encryptor (AES_D) using the AES cipher.

Therefore, it is possible to deal with the triply-encrypted management key EEE-FKeyv,k=Encrypt (IDKeyk, EE-FKeyv,k) using the AES cipher.

<Authentication Operation>

The authentication flow according to the second modification is as shown in FIG. 13.

As shown in FIG. 13, the AES cipher is used in step group ST3 in the present modification.

<FKB (Family Key Block)>

Next, key management information FKB (Family Key Block) according to the second modification will be described in more detail by using FIG. 14. Incidentally, the key management information FKB is also the same for the third modification described below.

Figure 14:
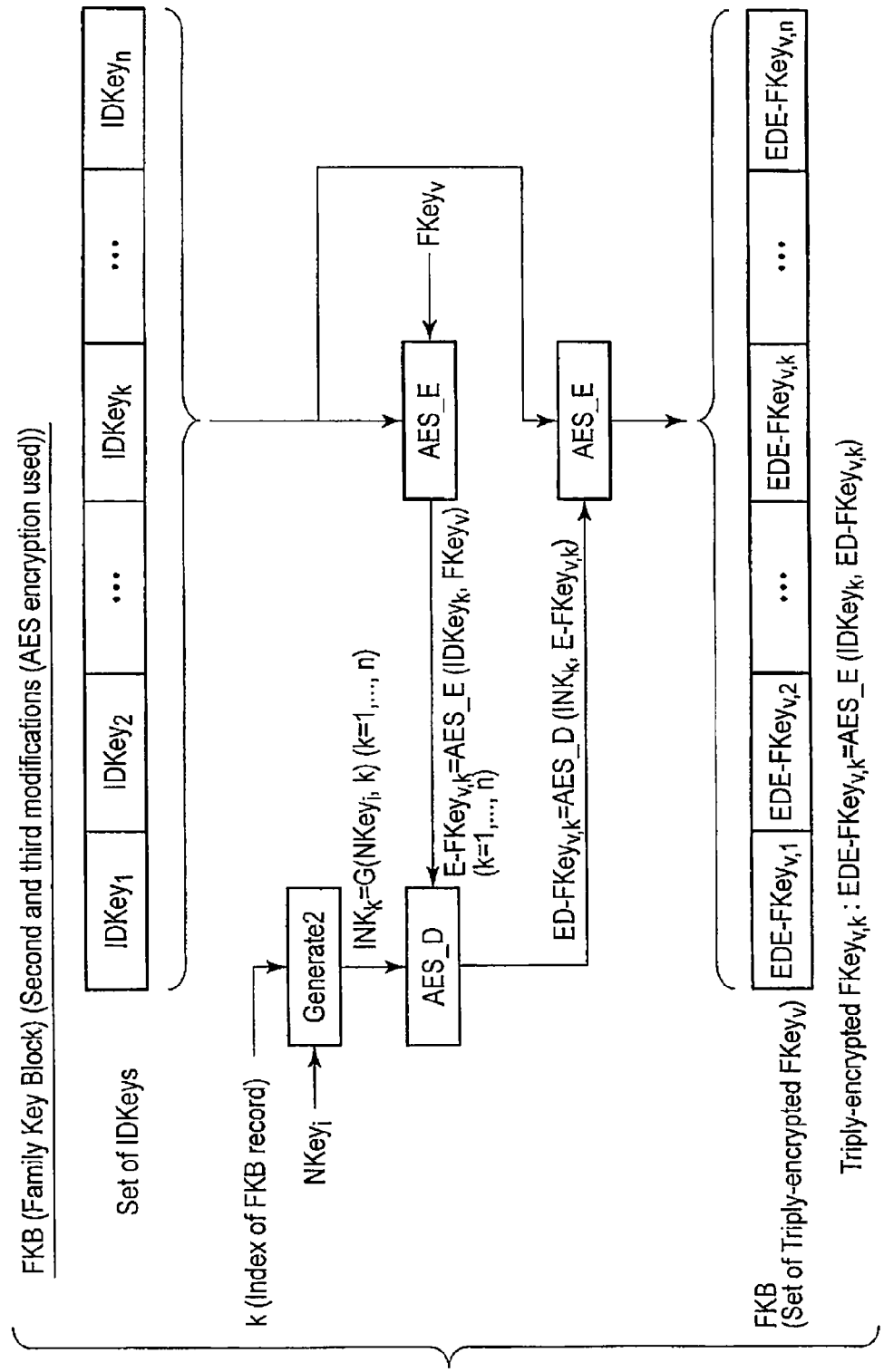
FIG. 14 is a diagram showing a configuration example of an encrypted FKey pack (FKB) according to the second modification.

As shown in FIG. 14, in order to generate the triply-encrypted key management information FKB in the present modification using the AES cipher, a further encryption process is added.

First, the index key INKk (k=1, . . . , n) is generated by a predetermined generation algorithm in the generator 16 using the index k corresponding to each IDKeyk of IDKeyk's (k=1, . . . , n) (Set of IDKeyk's) which are the secret key information prepared in advanced and secret information (first key information) NKeyi hidden in the NAND flash memory 10 which stores FKB prepared to protect the management key FKeyv:

INKk=Generate2(NKeyi, k) (k=1, . . . , n).

FKeyv is encrypted as the single encryption using each identification key information IDKeyk (k=1, . . . , n) to obtain encrypted management key E-FKeyv,k=AES_E(IDkeyk, FKeyv) (k=1, . . . , n).

Subsequently, each encrypted management key E-FKeyv,k to which another as the double encryption by using AES decryption process (AES_D) with one INKk (k=1, . . . , n) after another as index key prepared in advance.

Subsequently, as triple-encryption, each doubly-encrypted management key ED-Fkeyv,k=AES_D(INKk, E-FKeyv,k) is encrypted after another similarly with using the identification key information IDKeyk by AES cipher corresponding to each index (k), respectively.

Thus, triply-encrypted management key Triply-encrypted FKeyv,k:EDE-FKeyv,k=AES_E(IDKeyk, ED-FKeyv,k) (k=1, . . . , n) can be obtained as the key management information FKB according to the present modification.

Incidentally, to indicate encrypted (Encrypt) data using the AES encryption process, it is written as "E-", to indicate encrypted data using the AES decryption process, it is written as "D-" in the figure. When the data triply-encrypted using the AES encryption is described with "EDE-", it indicates that the first, second and third encryption uses the AES encryption process, AES decryption process and AES encryption process, respectively.

<Advantageous Effect>

As described above, according to the host device, semiconductor memory device, and authentication method according to the second modification, the same advantages as at least the above (1) to (5) can be obtained. Furthermore, it is possible to use the AES cipher in the present modification example if needed.

Third Embodiment

FKB Triply-Encrypted

A host device, a semiconductor memory device and an authentication method according to the third embodiment will be described.

The present embodiment relates to an example where the key management information FKBv is triply-encrypted management key pack EEE-FKeyv,k=Encrypt (IDKeyk, EE-FKeyv,k) (k=1, . . . , n) as multiplex encryption. In the description, overlapping points with the second embodiment will be omitted.

<Memory System>

The memory system according to the third embodiment is as shown in FIG. 15.

As shown by the dashed line in FIG. 15, the present embodiment is different from the second embodiment in that the NAND flash memory 10 does not include the encryptor (Encrypt) 101, and accordingly the host device 20 also does not include the decryptor (Decrypt) 201.

Thus, since the memory system does not include the encryptor 101 or the decryptor 201, processing time can be advantageously accelerated.

<Authentication Operation>

Figure 16:
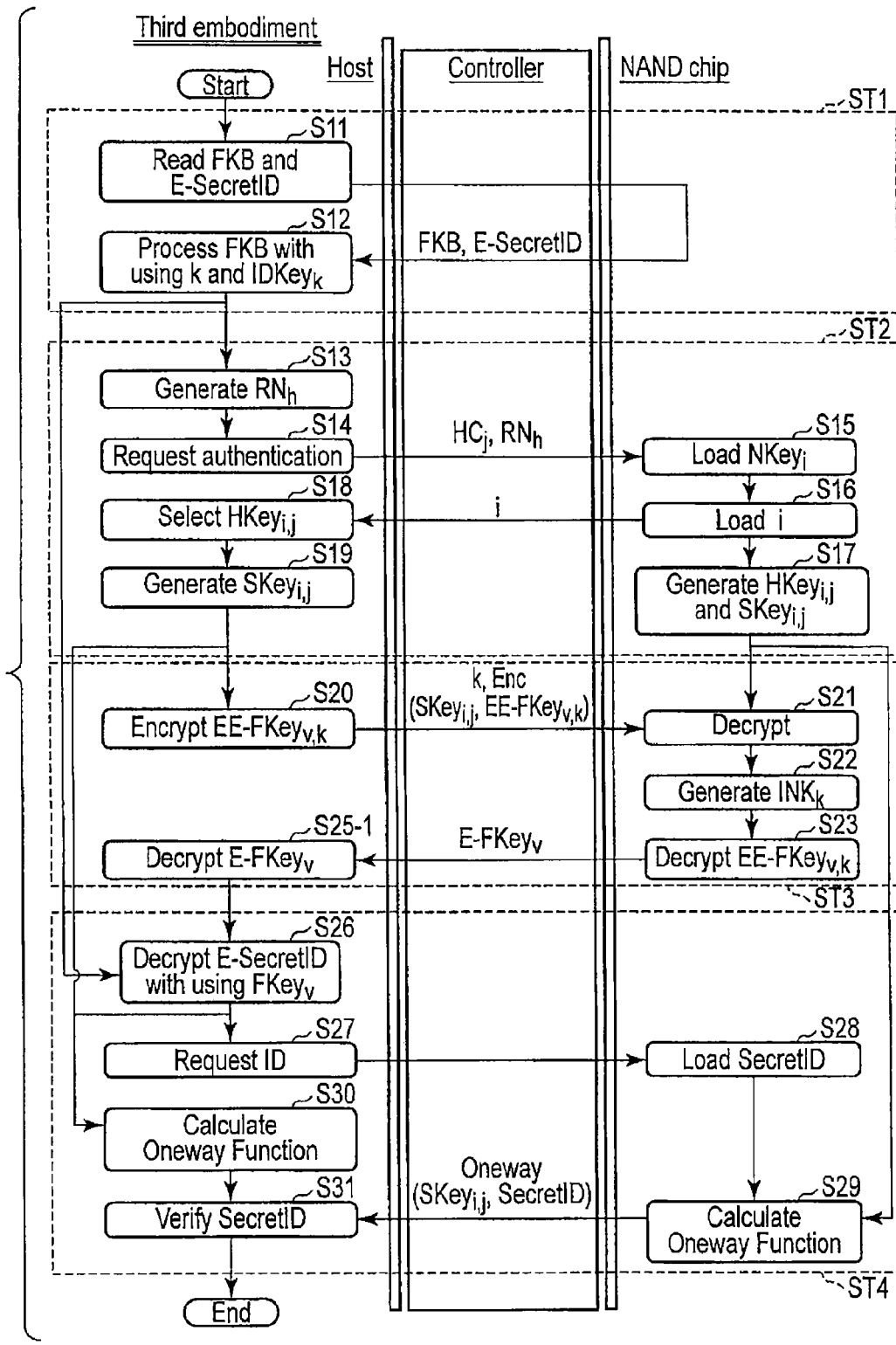
FIG. 16 is a flow chart showing the authentication flow of the memory system according to the third embodiment.

The authentication flow of the memory system according to the third embodiment is as shown in FIG. 16. As shown in FIG. 16, since the memory system does not include the encryptor 101 or the decryptor 201 in the present embodiment, steps S24 and S25 are unnecessary.

<Advantageous Effect>

As described above, according to the host device, semiconductor memory device, and authentication method according to the third embodiment, the same advantages as at least the above (1) to (5) can be obtained.

Furthermore, since the memory system does not include the encryptor 101 or the decryptor 201 in the present modification, steps S24 and S25 can be omitted. Therefore, processing time required for the authentication processing and acceleration can be advantageously reduced.

[Third Modification (FKB Triply-Encrypted)]

Next, a host device, a semiconductor memory device and an authentication method according to a third modification will be described. The present modification relates to an example where the third embodiment is implemented using the AES encryption as in the second modification.

<Memory System>

The memory system according to the third modification is as shown in FIG. 17.

The present modification is an example where the third embodiment is implemented using the AES cipher.

Therefore, as shown in FIG. 17, the encryptor and decryptor in the memory system are implemented as respective AES processors (AES_E, AES_D) using the AES cipher as described above. However, since the encryptor 101 and decryptor 201 are not included as in the above third embodiment, they are not implemented as the AES processor using the AES cipher.

<Authentication Operation>

The authentication flow according to the third modification is as shown in FIG. 18.

As shown in FIG. 18, the AES encryption is used in step group ST3 in the present modification. Similarly, since the encryptor 101 or decryptor 201 is not included, steps S24 and S25 can be omitted.

<FKB (Family Key Block)>

The key management information FKB (Family Key Block) according to the present modification is the same as that according to the second modification shown in FIG. 14. Therefore, detailed description is omitted.

<Advantageous Effect>

As described above, according to the host device, semiconductor memory device and authentication method according to the third modification, the same advantages as at least the above (1) to (5) can be obtained. Furthermore, it is possible to use the AES cipher in the present modification if needed.

Fourth Embodiment

Writing of Secret Information and FKB

Writing the above secret information or key management information FKB will be described as the fourth embodiment.

A case of writing the secret information or key management information FKB according to the first embodiment is taken as an example. In the following description, overlapping points with the first embodiment will be omitted.

4-1. When Writing Secret Information or Key Management Information FKB During Manufacture of the NAND Flash Memory First, a case where secret information or key management information FKB is written, for example, during manufacture of the NAND flash memory 10 will be described by using FIG. 19.

A licensing administrator 40 generates data below: FKBv (v=1, . . . , n), FKeyv(v=1, . . . , n), v (v=1, . . . , n), NKeyi and i. FKBv is generated by, as described above, encrypting FKeyv. In addition, v may be a plurality of values. If, for example, the licensing administrator 40 generates three values of 1, 2, and 3 as v, the licensing administrator 40 generates (FKB1, FKey1), (FKB2, FKey2), and (FKB3, FKey3) in accordance with the generated v.

Of the generated data, the licensing administrator 40 delivers FKeyv(v=1, . . . , n), v(v=1, . . . , n), NKeyi and i to a memory vendor 30. For the delivery of the data, for example, the licensing administrator 40 uses safe means such as sending the data to the memory vendor 30 after the data being encrypted by using a public key of the memory vendor 30 obtained in advance.

In the memory vendor 30, there are selectors 32, 33, a generator 34, and an encryption unit 35, in addition to the NAND flash memory 10. The memory vendor 30 further holds data 31 such as FKBv (v=1, . . . , n) delivered by the licensing administrator 40.

With the above configuration, the memory vendor 30 that receives the data 31 selects one value from v (v=1, . . . , n) by the selector 32, and the value of v is written into the ROM area 11-3 of the NAND flash memory 10 as the index information v (index of FKey).

The memory vendor 30 also writes the value of index information i (index of NKey) into the read/write area 11-1 of the NAND flash memory 10 and the value of NKeyi into the hidden area 11-2.

The memory vendor 30 generates the secret identification information SecretID in the generator (SecretID Generator) 34. Furthermore, the selector 32 selects FKeyv corresponding to the selected v. The memory vendor 30 encrypts the generated SecretID using selected FKeyv to generate the encrypted secret identification information E-SecretID.

Further, the memory vendor 30 writes the value of SecretID into the hidden area 11-2 of the NAND flash memory 10 and the value of E-SecretID into the ROM area 11-3.

With the above operation, predetermined secret information and FKB can be written during manufacture of the NAND flash memory 10. Regarding the order of writing each of the above values, E-SecretID is a value obtained after an encryption process and can be written after the encryption process by the encryption unit 35. Otherwise, there is no restriction on the order of writing operation and the values may be written in an order different from the order of the above example.

Further, the memory vendor 30 delivers the NAND flash memory 10 for which the write process is completed to a card vendor.

Thus, in the present embodiment, the NAND flash memory 10 can be brought to a state in which index information v (index of FKey) and other data is already written.

4-2. When FKB is Written by the Card Vendor

Figure 20:
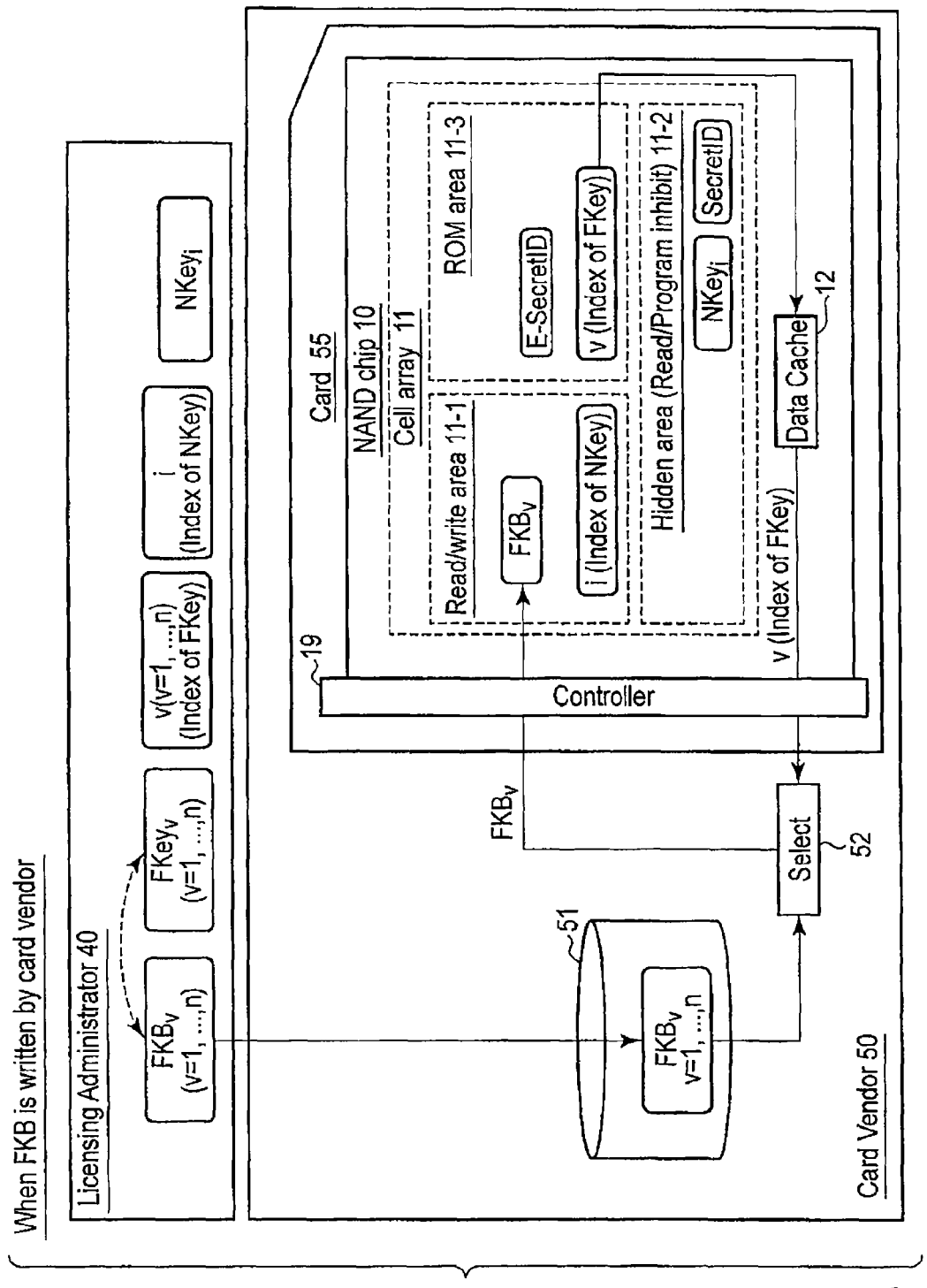
FIG. 20 is a diagram illustrating a write process of FKB by a card vendor according to the fourth embodiment.

Next, a case where a card vendor 50 writes FKB will be described by using FIG. 20.

The card vendor 50 receives the NAND flash memory 10 to which the predetermined information v and the like have been written from the memory vendor 30. Then, the card vendor 50 manufactures storage media (here, Card) 55 for general users like, for example, SD cards (registered trademark) by connecting the controller 19 that controls the NAND flash memory 10.

In the card vendor 50, there is a selector 52, in addition to the storage media (Card) 55 and data (FKBv) 51 received from the licensing administrator 40.

The process to write key management information FKBv by the card vendor 50 is as follows.

First, the card vendor 50 receives the FKBv from the licensing administrator 40 as the data 51. For the delivery of the data 51, the above safe means is used.

Then, the card vendor 50 reads the value of the index information v recorded in the ROM area 11-3 of the NAND flash memory 10 into the data cache 12C or the like (via the controller 19).

Subsequently, the card vendor 50 selects the FKBv corresponding to the value of the index information v through the selector 52, and writes the selected FKBv into the read/write area 11-1 of the NAND flash memory 10 via the controller 19.

4-3. When FKB is Written Later

Writing an encrypted FKey pack (FKB) later will be described.

The process is a process that is not particularly needed if the encrypted FKey pack (FKB) is written during manufacture of the NAND flash memory 10. However, the process relates to a write process of FKB needed when the NAND flash memory 10 and the controller 19 are connected and the NAND flash memory 10 is acquired by a general user as, for example, an SD card (registered trademark) and FKB is written later on the market when the card is used.

Figure 21:
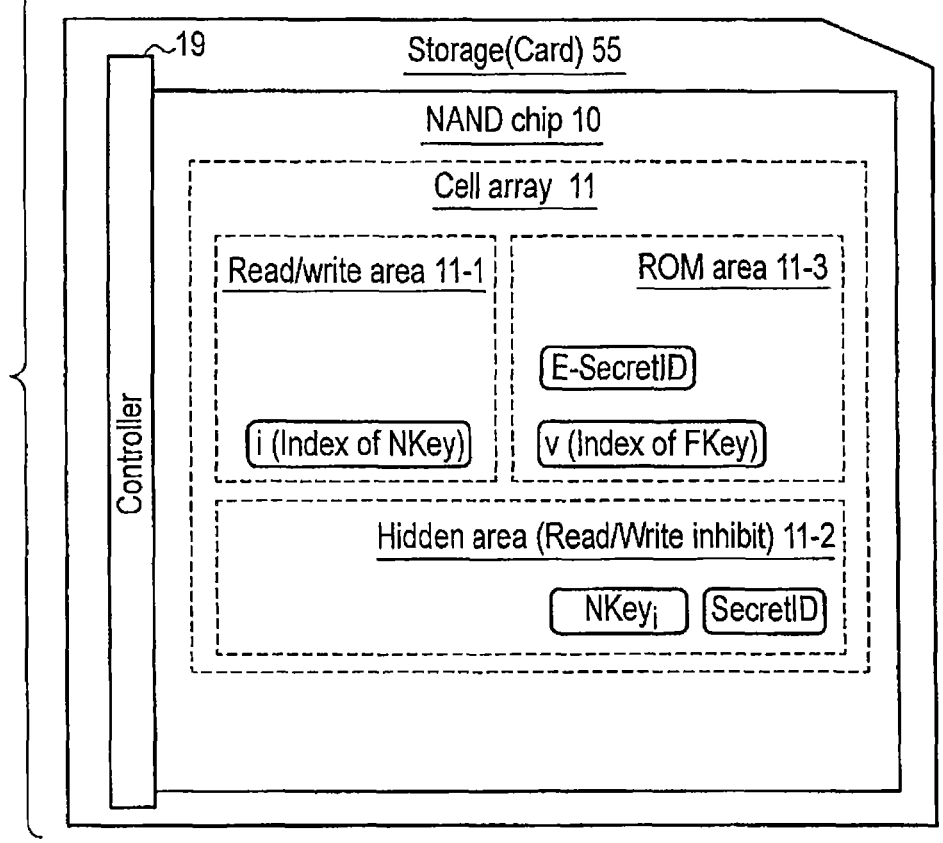
FIG. 21 is a diagram illustrating a card without recording FKB in shipment.

FIG. 21 shows a state in which the key management information FKB is not, as described above, recorded in the storage media (Card) 55.

As shown in FIG. 21, the NAND flash memory 10 has NKeyi and SecretID recorded in the hidden area 11-2. Index information v needed to identify FKB, and encrypted SecretID (E-SecretID) with FKeyv specified by the index information v are recorded in the ROM area 11-3. Index information i needed to identify the NKeyi is written in the read/write area. However, the key management information FKB is not yet recorded in the NAND flash memory 10.

Next, a case where the FKB is, as described above, downloaded from a server and recorded in the storage media 55 will be described by using FIG. 22.

In this case, as shown in FIG. 22, the data cache 12 is arranged in the NAND flash memory 10 if necessary.

A server 70 according to the present embodiment has an FKB data base (FKBv (v=1, . . . , n)) 71 and a selector 72 to select FKBv based on v.

The server 70 and the memory system (the NAND flash memory 10, the controller 19, and the host device 20) are electrically connected for communication via an Internet 60.

The host device 20 equips a function to determine whether it is necessary to newly write FKB and to download FKB from the server if necessary.

<FKB Write Flow>

Next, the flow to download an encrypted FKey pack (FKB) from the server 70 and to write the FKB into the NAND flash memory 10 will be described along FIG. 23.

(Step S41)

Figure 23:
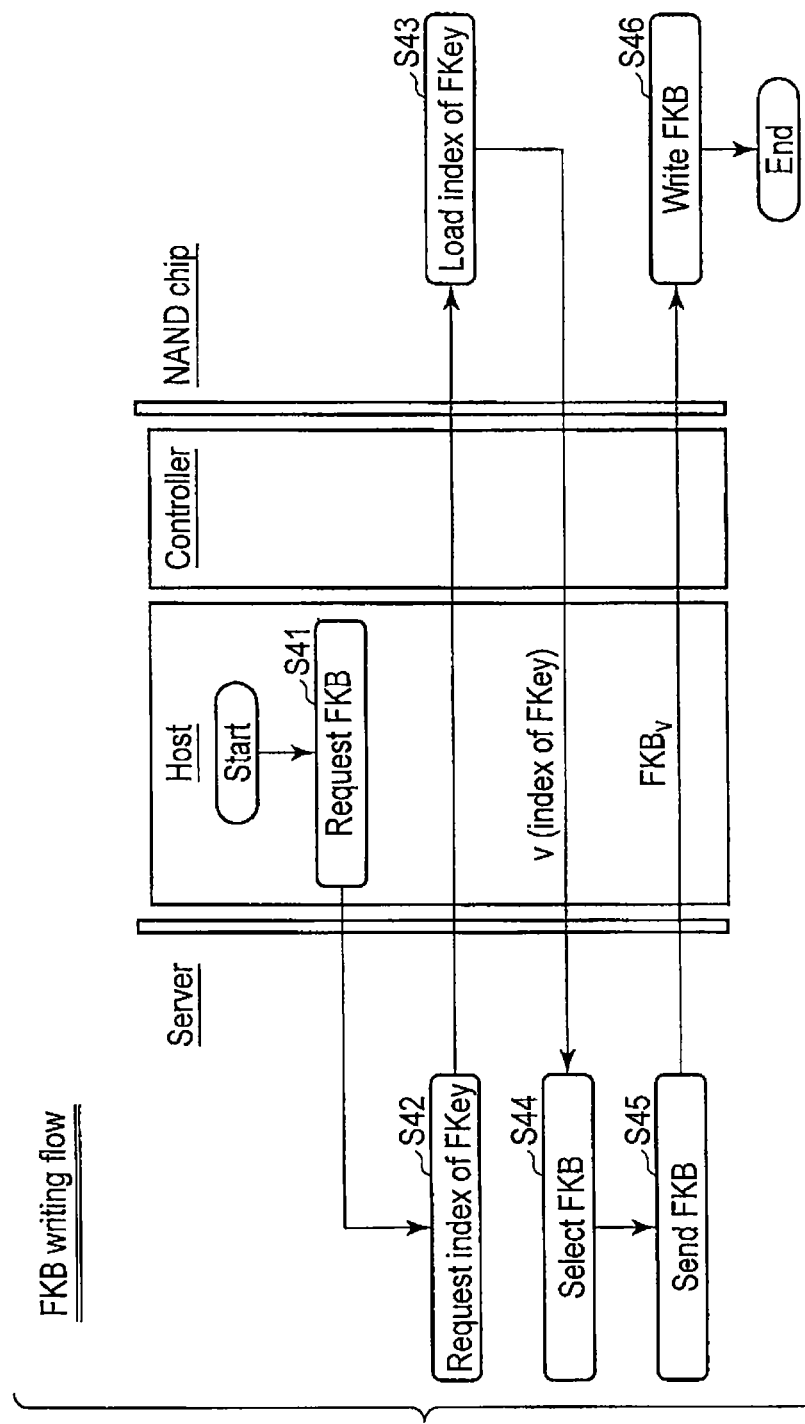
FIG. 23 is a flow chart showing a flow of downloading FKB according to the fourth embodiment.

First, as shown in FIG. 23, when the host device 20 determines that it is necessary to download FKB, FKB writing is started and the host device 20 issues an FKB request to the server 70.

(Step S42)

Subsequently, the server 70 sends request of index information v needed to identify FKeyv to the NAND flash memory 10.

(Step S43)

Subsequently, the NAND flash memory 10 reads v from the ROM area 11-3 and sends out v to the server.

(Step S44)

Subsequently, the server 70 selects FKBv corresponding to the received v from the FKB database 71.

(Step S45)

Subsequently, the server 70 sends out the selected FKBv to the NAND flash memory 10.

(Step S46)

Subsequently, the NAND flash memory 10 writes the received FKBv into the read/write area 11-1 for recording.

With the above operation, the download flow of the encrypted FKey pack (FKB) according to the fourth modification is completed (End).

<FKB (Family Key Block)>

As the key management information FKB (Family Key Block) according to the present embodiment, it is possible to use any FKB of the first to third embodiments because it does not depend on the configuration method. Therefore, detailed description is omitted.

<Advantageous Effect>

According to the configuration and operation according to the fourth embodiment, the same advantages as at least the above (1) to (5) can be at least obtained. Furthermore, according to the present embodiment, when writing the FKB later, it is possible to apply the present embodiment if needed, and the following advantage (6) can be obtained.

(6) The manufacturing process can advantageously be simplified and manufacturing costs can be reduced.

The NAND flash memory 10 according to the present embodiment includes in the read/write area 11-1 key management information (FKBv) attached uniquely to each of the NAND flash memories 10 in accordance with uses thereof or commonly to a plurality of the NAND flash memories 10 in units of the production lot or the like. Further, the NAND flash memory 10 according to the present embodiment includes in ROM area 11-3 encrypted secret identification information (E-SecretID) attached uniquely to each of the NAND flash memories 10.

If the key management information (FKBv) is made common in units of the production lot, unique information that needs to be recorded in each of the NAND flash memories 10 can be reduced to small data in data size such as the encrypted secret identification information (E-SecretID). In other words, the data size of unique encrypted secret identification information (E-SecretID) to be written into the NAND flash memories 10 can be reduced by dividing information to be written into commonly attached key management information (FKBv) and unique encrypted secret identification information (E-SecretID) and encrypting the information in two separate stages.

Figure 19:
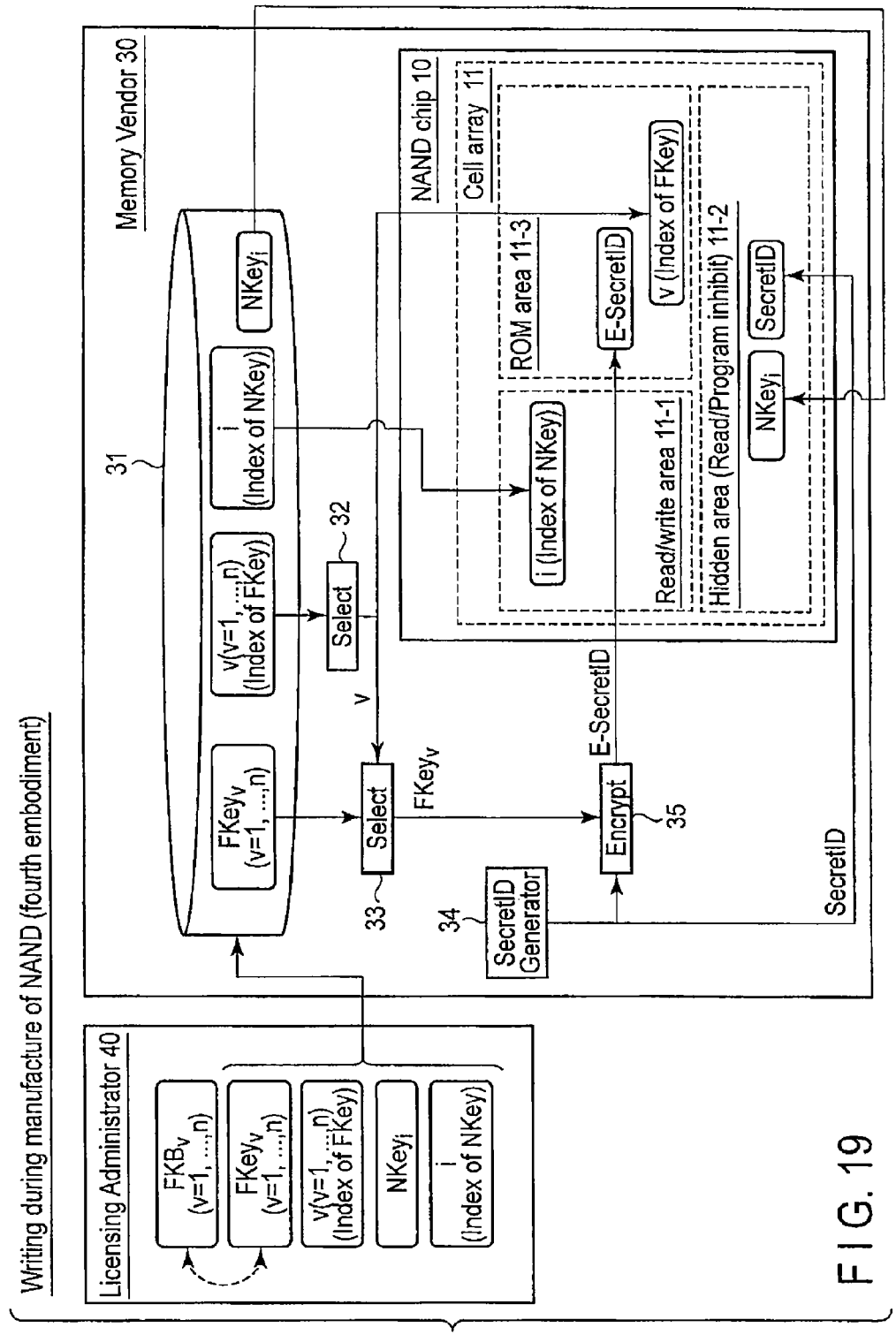
FIG. 19 is a diagram illustrating a write process of secret information by a NAND vendor according to the fourth embodiment.

For example, as shown in FIG. 19 above, the memory vendor 30 writes unique information (E-SecretID) into each of the NAND flash memories 10 received from the licensing administrator 40 during manufacture of the NAND flash memories.

The encrypted key management information (FKBv) commonly attached to the NAND flash memories 10 can commonly be written into the NAND flash memories 10 by the card vendor 50. For example, as shown in FIG. 20 above, the card vendor 50 writes the common key management information FKBv to each of the NAND flash memories 10 received from the licensing administrator 40. Thus, the size of unique data that must be written into each of the NAND flash memories 10 by the memory vendor 30 can be reduced.

If information unique to the NAND flash memory 10 and whose data size is large is written during manufacture of the NAND flash memories 10, the manufacturing process will be more complex and the manufacturing time will be longer, leading to increased costs of manufacturing. According to the configuration and method in the present embodiment, however, such a complex manufacturing process becomes unnecessary by dividing information to be written into commonly attached key management information (FKBv) and unique encrypted secret identification information (E-SecretID) and encrypting the information in two separate stages and therefore, the manufacturing process can advantageously be simplified and manufacturing costs can be reduced. Moreover, the manufacturing time can be shortened, offering advantages of being able to reduce power consumption.

Also on the side of the host device 20, advantages similar to those of the NAND flash memory 10 can be gained by adopting a configuration of generating E-SecretID by encrypting SecretID, which is a unique value to the NAND flash memory, by using FKey and further generating FKB by encrypting FKey using IDKeyk.

Fifth Embodiment

SecretID Encrypted by a Public Key Cryptosystem

A host device, a semiconductor memory device and an authentication method according to the fifth embodiment will be described. The present embodiment relates to an example where the SecretID is encrypted by a public key cryptosystem. In the description, overlapping points with the first embodiment will be omitted.

In the first embodiment, the SecretID is encrypted using the common key encryption with the FKeyv used as the encryption key. In the fifth embodiment, the SecretID is encrypted using the public key cryptosystem. The details of the encryption will be described later using FIG. 26.

<Memory System>

Figure 24:
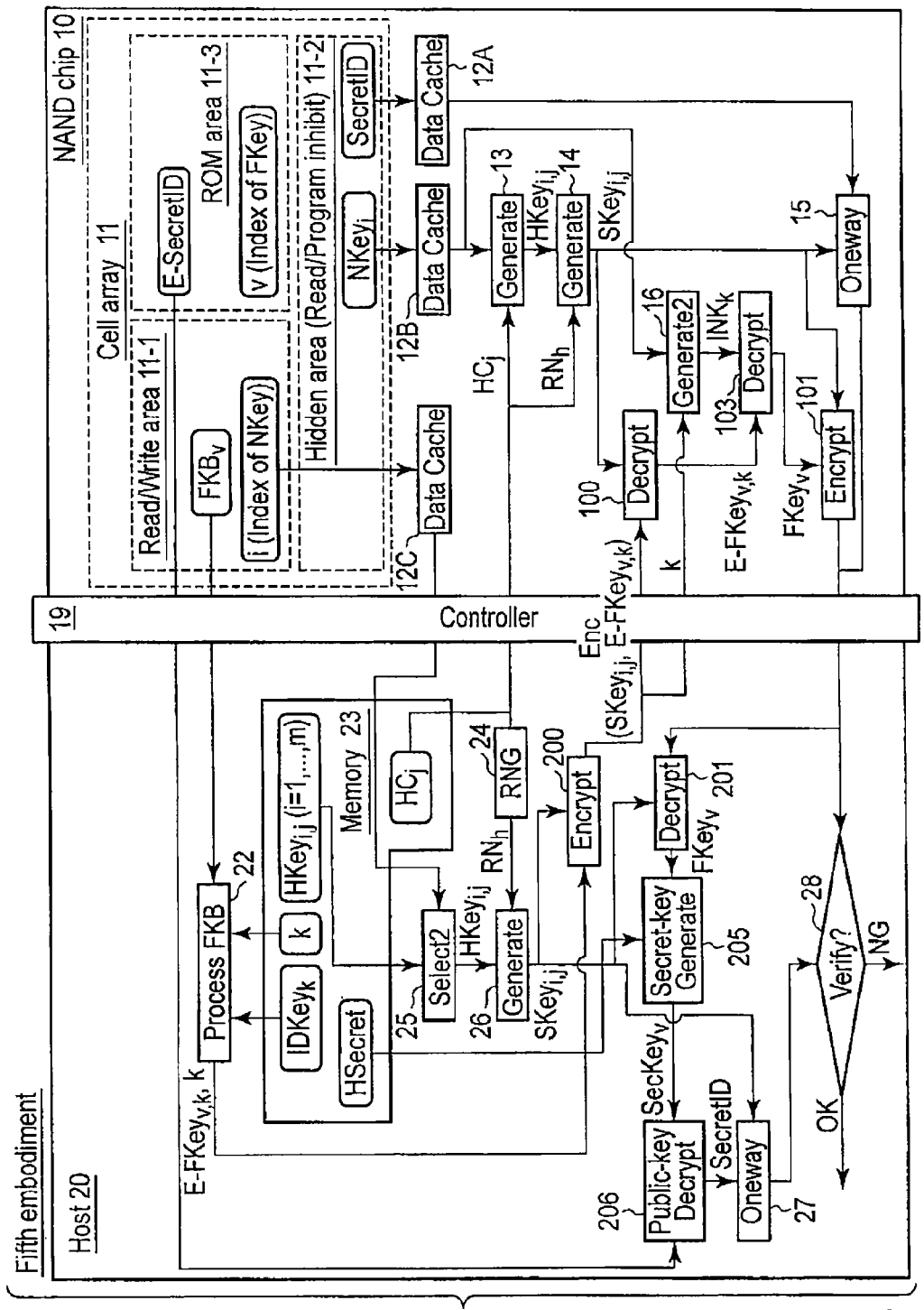
FIG. 24 is a block diagram showing a configuration example of a memory system according to a fifth embodiment.

The memory system according to the fifth embodiment is as shown in FIG. 24.

As shown in FIG. 24, the memory system according to the present embodiment is different from the first embodiment in the following points.

First, the host device 20 stores host secret information HSecret in the memory 23. Moreover, the host device 20 further includes a secret key generator (Secret-Key Generate) 205 and a decryptor (Public-Key Decrypt) 206 of the public key cryptosystem system.

The secret key generator 205 generates secret key information SecKeyv using the key information FKeyv output from the decryptor 201 and host secret information HSecret.

The decryptor 206 obtains the secret identification information SecretID by decrypting the encrypted secret identification information E-SecretID with the public key cryptosystem using the secret key information SecKeyv. The details of these operations will be described in the following authentication flow.

<Authentication Operation>

The authentication flow of the memory system according to the fifth embodiment is as shown in FIG. 25. As shown in FIG. 25, the present embodiment is different from the first embodiment in performing steps S205 and S206.

(Step S205)

The host device 20 generates the public key information SecKeyv using the obtained management key Fkeyv and the host secret information HSecret in the secret key generator 205. The specific process in the secret key generator 205 is shown as the following formula (I).

$$SecKeyv = F(FKeyv, HSecret) = FKeyv \text{ XOR } HSecret \quad \text{Formula (I)}$$

XOR refers to the exclusive OR for every bit. Incidentally, the function F is not limited to the formula (I) and can be defined as any function so long as it can generate the secret key SecKeyv corresponding to the public key PubKeyv from FKeyv and HSecret.

(Step S206)

Subsequently, the host device 20 decrypts the encrypted secret identification information E-SecretID read from the NAND flash memory 10 using the generated secret key information SecKeyv in the decryptor 206 of the public key cryptosystem system to obtain the secret identification information SecretID.

<When Writing During Manufacture of the NAND Flash Memory>

Next, a case where the secret information and key management information FKB are written, for example, during manufacture of the NAND flash memory 10 will be described by using FIG. 26.

As shown in FIG. 26, the licensing administrator 40 is different from that of the above embodiments in that it generates the public key information PubKeyv (v=1, ..., n), the secret key information SecKeyv (v=1, ..., n), and the host secret information HSecret as well as the above data FKBv (v=1, ..., n) and FKeyv (v=1, ..., n) and v (v=1, ..., n) and NKeyi, and i.

The key information set (PubKeyv, SecKeyv) is the set of the public key and secret key in the public key cryptosystem. As the public key cryptosystem, any public key cryptosystem, such as the RSA cryptograph, ElGamal cryptosystem, and elliptic curve cryptosystem can be used. The host secret information HSecret is the secret information given to the host device 20.

After generating FKeyv, the secret key SecKeyv which satisfies above formula (I) is determined, and then the public key PubKeyv corresponding to this secret key SecKeyv is determined. FKeyv which satisfies formula (I) may be determined after generating the key information set (PubKeyv, SecKeyv).

Subsequently, the licensing administrator 40 delivers to the memory vendor 30 the public key PubKeyv (v=1, ..., n), v (v=1, ..., n), NKeyi, and i among the generated data as the data 31.

The memory vendor 30 which has received the data 31 selects one value of v in the selector 32, and generates the secret identification information SecretID in the generator (SecretID Generator) 34. Furthermore, the selector 32 selects the public key PubKeyv corresponding to the selected v.

The memory vendor 30 encrypts the generated SecretID by the public key cryptosystem system using the selected public key PubKeyv to generate the encrypted secret identification information E-SecretID.

Other points are the same as those of the fourth embodiment.

Incidentally, description has been made to an example where the host secret information HSecret is common to all the host devices; however, different host secret information may be prepared by each host device vendor, and different host secret information may be used for every period. In this case, the public key corresponding to the management key data and each of the host secret information will be generated. Therefore, in FIG. 26, a plurality of encrypted secret identification information items are written in the NAND flash memory.

<Advantageous Effect>

As described above, according to the host device, semiconductor memory device and authentication method according to the fifth embodiment, the same advantages as at least the above (1) to (5) can be obtained.

As described above, in the fifth embodiment, the secret identification information SecretID is encrypted by public key cryptosystem using the public key PubKeyv. Thus, it is possible to apply the present embodiment if needed. Incidentally, the fifth embodiment is indeed applicable to not only the first embodiment but each embodiment and modification.

Sixth Embodiment

Configuration Example of the NAND Flash Memory

A configuration example of the above NAND flash memory 10, etc. will be described as the sixth embodiment. In the description, overlapping points with the first embodiment will be omitted.

6-1. Overall Configuration Example of the NAND Flash Memory

An overall configuration example of the NAND flash memory 10 according to the fifth embodiment will be described by using FIG. 27.

Figure 27:
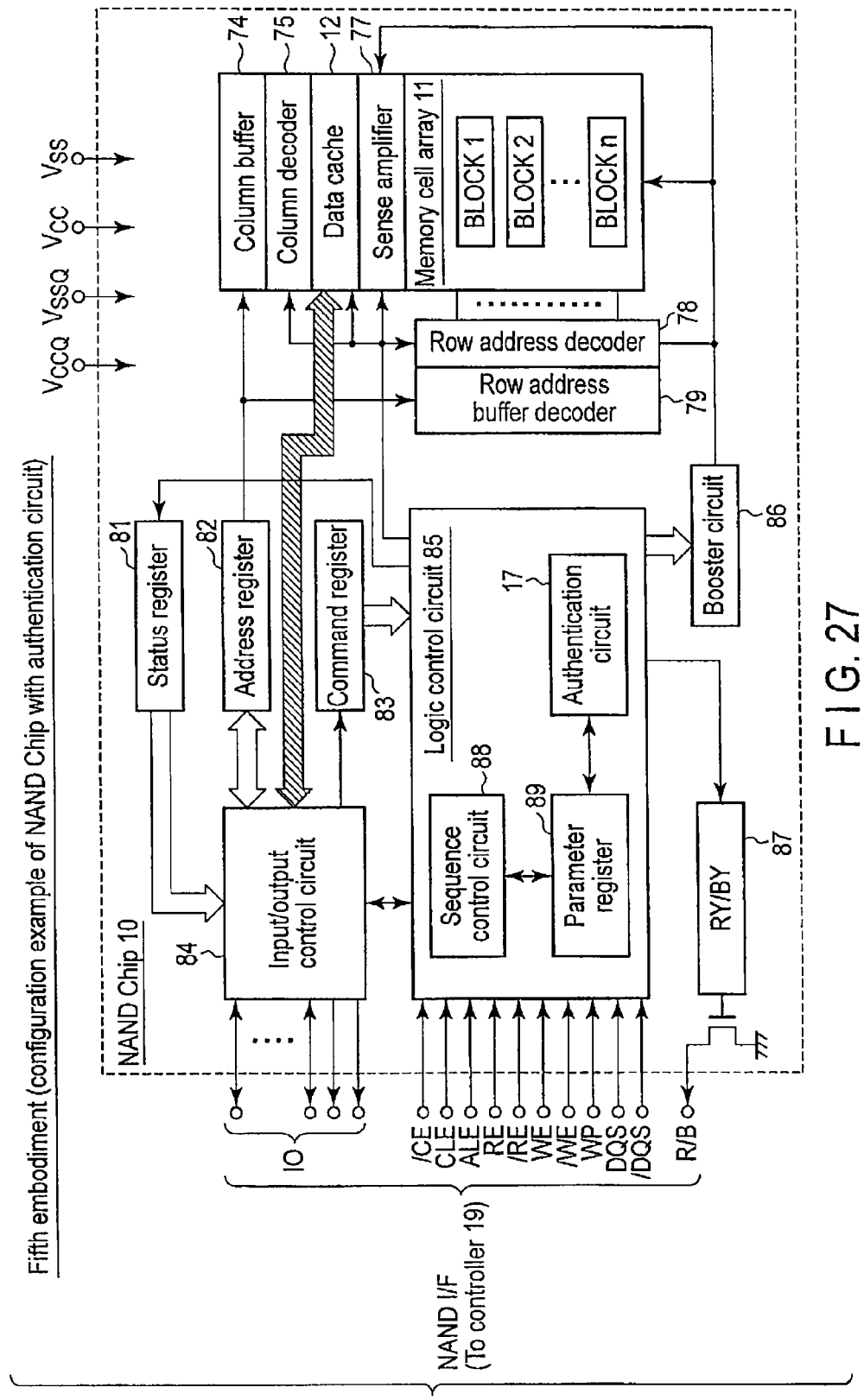
FIG. 27 is a block diagram showing a configuration example of a NAND flash memory according to a sixth embodiment.

As shown in FIG. 27, the NAND flash memory 10 includes a memory cell array 11 and a peripheral circuit.

The memory cell array 11 includes a plurality of blocks BLOCK1 to BLOCKn. The configuration of each block, which will be described with reference to FIG. 28, contains a plurality of memory cell transistors MC, word lines WL, and bit lines BL. Data in the memory cell transistors MC in each block is erased by one operation. Data cannot be erased in units of memory cell transistors or pages. That is, individual blocks are the minimum erasure units.

The peripheral circuit includes a sense amplifier 77, an input/output control circuit 84, and a logic control circuit 85.

The sense amplifier 77 reads data of a memory cell (memory cell transistor MC) in the memory cell array 11 via the bit line BL and detects the state of a memory cell in the memory cell array 11 via the bit line BL.

Data caches 12 (12A-12C) temporarily holds data read from the sense amplifier 77 or data to be supplied to the sense amplifier 77.

A column decoder 75 selects the specific bit line BL, sense amplifier or the like based on an address signal supplied via an IO terminal from outside the NAND flash memory 10.

A column address buffer 74 temporarily holds address signals to supply the address signals to the column decoder 75.

A row decoder 78 receives various voltages needed for reading, writing, or erasing data from a voltage generator 86 to apply such voltages to the specific word lines WL based on an address signal.

A row address buffer decoder 79 temporarily holds address signals to supply the address signals to the row decoder 78.

The voltage generator 86 receives reference power supply voltages VSS, VCC, voltages VSSQ, VCCQ and the like to generate a voltage needed for writing, reading, or erasing data from these voltages.

The input/output control circuit 84 receives various commands that control the operation of the NAND flash memory 10, address signals, and write data via the IO terminal and also outputs read data. Address signals output from the input/output control circuit 84 are latched by an address register 82. Latched address signals are supplied to the column address buffer 74 and the row address buffer decoder 79. Commands output from the input/output control circuit 84 are latched by a command register 83. A status register 81 holds various status values for the input/output control circuit 84.

The NAND flash memory 10 receives various control signals for controlling a command, address, IO terminal for data input/output, and operation from outside as an external interface (NAND I/F). Control signals include, for example, a chip enable /CE, command latch enable CLE, address latch enable ALE, read enable RE and /RE, write enable WE and /WE, write protect WP, and clocks DQS, /DQS.

These control signals are received at corresponding terminals, and then transferred to the logic control circuit 85. The logic control circuit 85 controls the input/output control circuit 84 based on control signals to permit or inhibit a signal on the terminal IO from reaching the address register 82, the command register 83, a page buffer 12 or the like as a command, address, or data via the input/output control circuit 84. The logic control circuit 85 also receives a latched command from the command register 83.

Of control signals, a WE terminal supplies a data input clock, an RE terminal supplies a data output clock, a DQS terminal transmits a data input/output clock, a CLE terminal is intended for enabling that input data input as a command, an ALE terminal is intended for enabling that inputs data input as an address, and a CE terminal is intended to enable overall functions of data input/output.

An R/B terminal indicates an internal operating state of the NAND flash memory 10, a WP terminal transmits a write prevention signal to prevent erroneous writing, and Vcc/Vss/Vccq/Vssq terminals are used to supply power. Also in the present embodiment, a /RE terminal, /WE terminal, and /DQS terminal that transmit respective complementary signals are present for the RE terminal, WE terminal, and DQS terminal as terminals (Toggle) used when data transmission is realized by a high-speed interface.

The logic control circuit 85 includes a sequence control circuit 88, a parameter register 89, and an authentication circuit 17. The logic control circuit 85 also manages output of a ready/busy signal (R/B). More specifically, the logic control circuit 85 outputs a busy signal while the NAND flash memory 10 is busy.

The sequence control circuit 88 receives a command from the command register 83. The sequence control circuit 88 controls the sense amplifier 77, the voltage generator 86 and the like so that the process (such as reading, writing, or erasing data) instructed by the command can be performed based on the received command.

The parameter register 89 holds a variety of the control parameters 890 specifying the operation of the logic control circuit 85. The control parameters 890 are referred to or updated by the sequence control circuit 88 and used for control of a sequence of the logic control circuit 85 or the input/output control circuit 84.

The authentication circuit 17 includes the generator 13 and executes the process related to the authentication. For example, as described above, the authentication circuit 17 also updates data, for example, rewrites the control parameters 890 contained in the parameter register. The authentication circuit 17 receives a command requesting the authentication and performs a specific operation for the authentication by using specific data in the memory cell array 11 to output the result out of the memory 10. In the process of executing a series of operations, the authentication circuit 17 permits the sequence control circuit 88 to read or write necessary data through updates of the control parameters 890.

A ready/busy circuit (RY/BY) 87 makes a notification of an R/B signal out of the NAND flash memory 10 via a switch transistor under the control of the logic control circuit 85.

6-2. Configuration Example of the Block (BLOCK)

Figure 28:
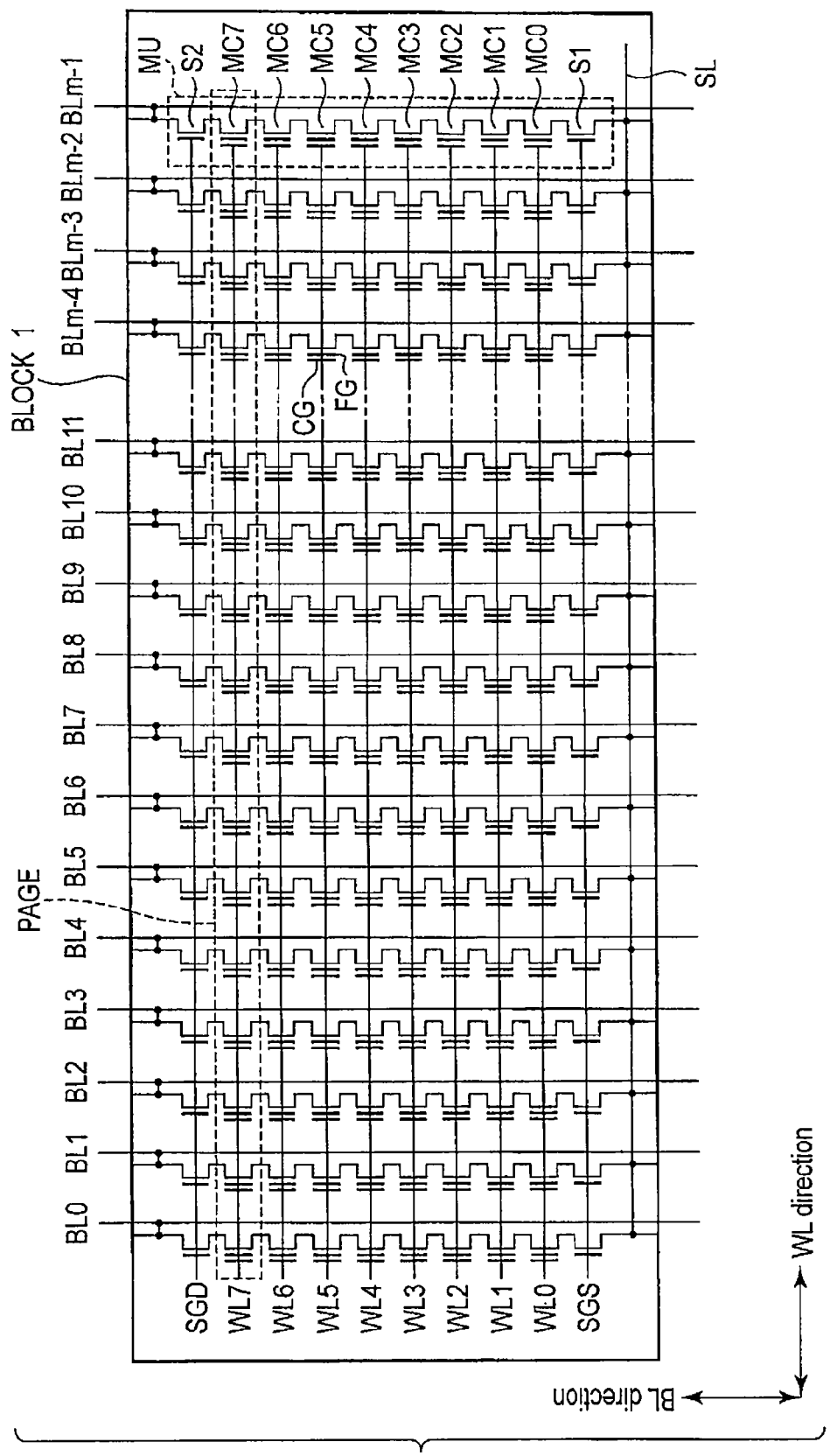
FIG. 28 is an equivalent circuit diagram showing a configuration example of one block of the NAND flash memory in FIG. 27.

Next, a configuration example of the block (BLOCK) forming the memory cell array 11 will be described by using FIG. 28. BLOCK1 in FIG. 27 is taken as an example for the description. Data in memory cells in the block BLOCK1 is erased, as described above, by one operation and thus, the block is the unit of data erasure.

The block BLOCK1 includes a plurality of memory cell units MU arranged in a word line direction (WL direction). The memory cell unit MU includes a NAND string (memory cell string) formed of eight memory cells MC0 to MC7 arranged in a bit line direction (BL direction) intersecting the WL direction and whose current path is connected in series, a select transistor S1 on the source side connected to one end of the current path of the NAND string, and a select transistor S2 on the drain side connected to the other end of the current path of the NAND string.

In the present embodiment, the memory cell unit MU includes eight memory cells MC0 to MC7, but may include two memory cells or more, for example, 56 or 32 memory cells and the number of memory cells is not limited to 8.

The other end of the current path of the select transistor S1 on the source side is connected to a source line SL. The other end of the current path of the select transistor S2 on the drain side is connected to a bit line BL provided above each memory cell unit MU corresponding to the memory cell unit MU and extending in the BL direction.

The word lines WL0 to WL7 extend in the WL direction to be commonly connected to control gate electrodes CG of a plurality of memory cells in the WL direction. A select gate line SGS extends in the WL direction to be commonly connected to a plurality of select transistors S1 in the WL direction. A select gate line SGD also extends in the WL direction to be commonly connected to a plurality of select transistors S2 in the WL direction.

A page (labeled with "PAGE" in FIG. 19) exists for each of the word lines WL0 to WL7. For example, as shown by being surrounded with a broken line in FIG. 19, page 7 (PAGE7) exists in the word line WL7. Because a data read operation or data write operation is performed for each page (PAGE), the page (PAGE) is the data read unit and the data write unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A host device capable of communicating with a memory device via a controller, the host device being configured to:
    transmit a read command of family key block data to cause the controller to read the family key block data from a third region of the memory device, the third region being readable and writable in the memory device;
    transmit a read command of encrypted secret data to cause the controller to read the encrypted secret data from a second region of the memory device, the second region being readable; and
    receive authentication information data and data for obtaining family key data calculated by the memory device via the controller to verify the authentication information data,
    wherein the authentication information data is stored in an area of the memory device which is prohibited from being accessed by the controller, and is generated by a calculation using secret data which is only used in the memory device, and
    wherein the host device is further configured to transmit a read command of key index data to cause the controller to read the key index data from a readable area of the memory device.

* * * * *